(12) United States Patent
Gargash et al.

(10) Patent No.: US 8,769,544 B2
(45) Date of Patent: Jul. 1, 2014

(54) METHOD AND SYSTEM FOR MANAGING PARALLEL RESOURCE REQUEST IN A PORTABLE COMPUTING DEVICE

(75) Inventors: Norman S. Gargash, Boulder, CO (US); Vinod Vijayarajan, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 13/224,198

(22) Filed: Sep. 1, 2011

(65) Prior Publication Data

US 2013/0061235 A1    Mar. 7, 2013

(51) Int. Cl.
*G06F 9/46* (2006.01)
*G06F 15/173* (2006.01)
*G06F 9/50* (2006.01)
*H04L 12/56* (2006.01)

(52) U.S. Cl.
CPC .............. *G06F 9/5005* (2013.01); *H04L 47/76* (2013.01)
USPC .......................................... 718/104; 709/226

(58) Field of Classification Search
CPC .............................. G06F 9/5005; H04L 47/76
USPC ........................................... 718/104; 709/226
See application file for complete search history.

(56) References Cited

U.S. PATENT DOCUMENTS

| | | | |
|---|---|---|---|
| 6,253,252 B1 * | 6/2001 | Schofield | 719/315 |
| 6,976,258 B1 | 12/2005 | Goyal et al. | |
| 7,447,775 B1 | 11/2008 | Zhu et al. | |
| 7,890,735 B2 | 2/2011 | Tran | |
| 7,926,062 B2 | 4/2011 | Nemirovsky et al. | |
| 2003/0005167 A1 | 1/2003 | Khare et al. | |
| 2005/0268302 A1 * | 12/2005 | Geib et al. | 718/100 |
| 2005/0283517 A1 | 12/2005 | Meduri et al. | |
| 2006/0168108 A1 * | 7/2006 | Hake et al. | 709/218 |

OTHER PUBLICATIONS

International Search Report and Written Opinion—PCT/US2012/051203—ISA/EPO—Dec. 18, 2012.
Menon S et al., "Object Replacement Using Dynamic Proxy Updates", Proceedings of the International Workshop on Configurabledistributed Systems, IEEE Computer Society, Los Alamitos, CA, US, Jan. 1, 1994, pp. 82-91, XP002004310.

* cited by examiner

*Primary Examiner* — Camquy Truong
(74) *Attorney, Agent, or Firm* — Nicholas A. Cole

(57) ABSTRACT

A method and system for managing parallel resource requests in a portable computing device ("PCD") are described. The system and method includes generating a first request from a first client, the first request issued in the context of a first execution thread. The first request may be forwarded to a resource. The resource may acknowledge the first request and initiate asynchronous processing. The resource may process the first request while allowing the first client to continue processing in the first execution thread. The resource may signal completion of the processing of the first request and may receive a second request. The second request causes completion of the processing of the first request. The completion of the processing of the first request may include updating a local representation of the resource to a new state and invoking any registered callbacks. The resource may become available to service the second request, and may process the second request.

44 Claims, 15 Drawing Sheets

METHOD AND SYSTEM FOR MANAGING PARALLEL RESOURCE REQUEST IN A PORTABLE COMPUTING DEVICE

DESCRIPTION OF THE RELATED ART

Portable computing devices ("PCDs") are becoming increasingly popular. These devices may include cellular telephones, portable/personal digital assistants ("PDAs"), portable game consoles, portable navigation units, palmtop computers, and other portable electronic devices.

PCDs may run various types of software for providing various functions and features. For example, PCDs may run entertainment software which may provide functions such as watching videos and playing video games. PCDs may also support other types of software such as business software or writing software, such as spreadsheets, e-mail, and/or word processing software.

Usually, the software described above running on a PCD requires actions from various hardware elements that are linked together. The interactions between the software and hardware elements can be controlled by an overall operational framework that can be thought of as a linked node structure. In some instances, the interaction between these elements occurs synchronously, where a request for a particular resource suspends operation of an element until the request is acknowledged and granted. In other instances, the interaction between these elements occurs asynchronously, where a request for a particular resource does not suspend the operation of the element while the request is processed.

However, it would be desirable for the requesting element to be able to determine whether the resource is allowed to continue operation while the request is processed.

SUMMARY

A method and system for managing parallel resource requests in a portable computing device are described. In an embodiment, the method and system includes generating a first request from a first client, the first request issued in the context of a first execution thread. The first request may be forwarded to a resource. The resource may acknowledge the first request and initiate asynchronous processing. The resource may process the first request while allowing the first client to continue processing in the first execution thread. The resource may signal completion of the processing of the first request and may receive a second request. The second request causes completion of the processing of the first request. The completion of the processing of the first request may include updating a local representation of the resource to a new state and invoking any registered callbacks. The resource may become available to service the second request, and may process the second request.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
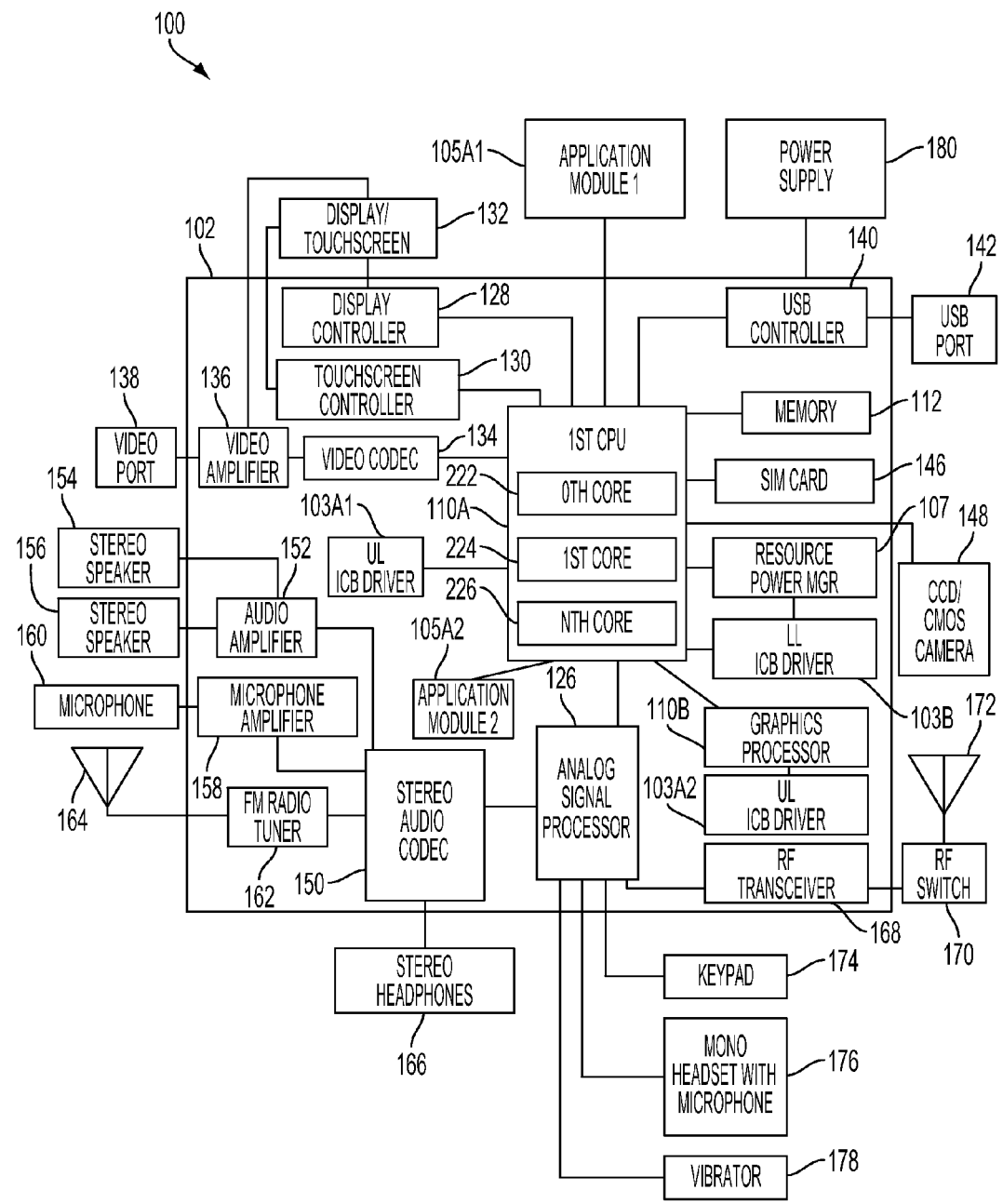
FIG. 1 is a functional block diagram illustrating exemplary elements of a system for managing parallel resource requests in a portable computing device ("PCD")

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a personal digital assistant ("PDA"), a smartphone, a navigation device, a smartbook or reader, a media player, a combination of the aforementioned devices, and a laptop computer with a wireless connection, among others.

FIG. 1 is a functional block diagram of an exemplary, non-limiting aspect of a PCD 100 in the form of a wireless telephone for implementing methods and systems for managing parallel resource requests in a portable computing device. As shown, the PCD 100 includes an on-chip system 102 that has a multi-core, central processing unit ("CPU") 110A, a graphics processor 110B, and an analog signal processor 126. These processors 110A, 110B, 126 may be coupled together on one or more system busses or another interconnect architecture, as know to those skilled in the art.

The CPU 110A may comprise a zeroth core 222, a first core 224, and an Nth core 226 as understood by one of ordinary skill in the art. In an alternative embodiment, instead of using a CPU 110A and a graphics processor 110B, one or more digital signal processors ("DSPs") may also be employed as understood by one of ordinary skill in the art. Further, two or more multi-core processors may also be used.

The PCD 100 may comprise internal chip bus ("ICB") driver modules 103 that are executed by processors 110. One of ordinary skill in the art will recognize that each ICB driver module 103 may comprise one or more software modules that may be divided into various parts and executed by different processors 110, 126 without departing from this disclosure.

There may be two types of ICB driver modules 103: an upper layer ("UL") type 103A; and a lower layer ("LL") type 103B. Generally, the UL ICB driver types 103A will usually be executed by one or more processors 110, 126 that may support the various application modules 105. The LL ICB driver types 103B will usually be executed by one hardware element referred to as the resource power manager 107.

The resource power manager 107 running the LL ICB driver 103B will be generally responsible for applying and setting bandwidth values. These bandwidth values will be applied by the resource power manager 107 to one or more buses and/or switch fabrics described below in connection with FIG. 2. The resource power manager 107 is generally responsible for setting the clock speeds for switch fabrics and buses as well as the clock speeds for the slaves. Slaves are generally hardware components that support requests from master processors 110 running application programs 105.

The ICB drivers 103A, B in combination with the resource power manager 107 allow for the dynamic creation of master-slave pairs at runtime for hardware components that may exist within similar switch fabrics and/or across different switch fabrics. The ICB drivers 103A, B and resource power manager 107 may calculate and adjusts bandwidths for switch fabrics and buses on-the-fly or in real-time.

In a particular aspect, one or more of the method steps described herein may implemented by executable instructions and parameters stored in the memory 112 that include the ICB drivers 103A, B. These instructions that form the ICB drivers 103A, B may be executed by the CPU 110A, the analog signal processor 126, and the resource power manager 107. Further, the processors 110A, 126, the resource power manager 107, the memory 112, the instructions stored therein, or a combination thereof may serve as a means for performing one or more of the method steps described herein.

As illustrated in FIG. 1, a display controller 128 and a touchscreen controller 130 are coupled to the multicore CPU 110A. A touchscreen display 132 external to the on-chip system 102 is coupled to the display controller 128 and the touchscreen controller 130.

FIG. 1 also illustrates a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134 coupled to the multicore CPU 110A. A video amplifier 136 is coupled to the video encoder 134 and the touchscreen display 132. A video port 138 is coupled to the video amplifier 136. A universal serial bus ("USB") controller 140 is coupled to the CPU 110A. Also, a USB port 142 is coupled to the USB controller 140. A subscriber identity module (SIM) card 146 may also be coupled to the CPU 110A. Further, as shown in FIG. 1, a digital camera 148 may be coupled to the CPU 110A. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the on-chip system 322.

Figure 2:
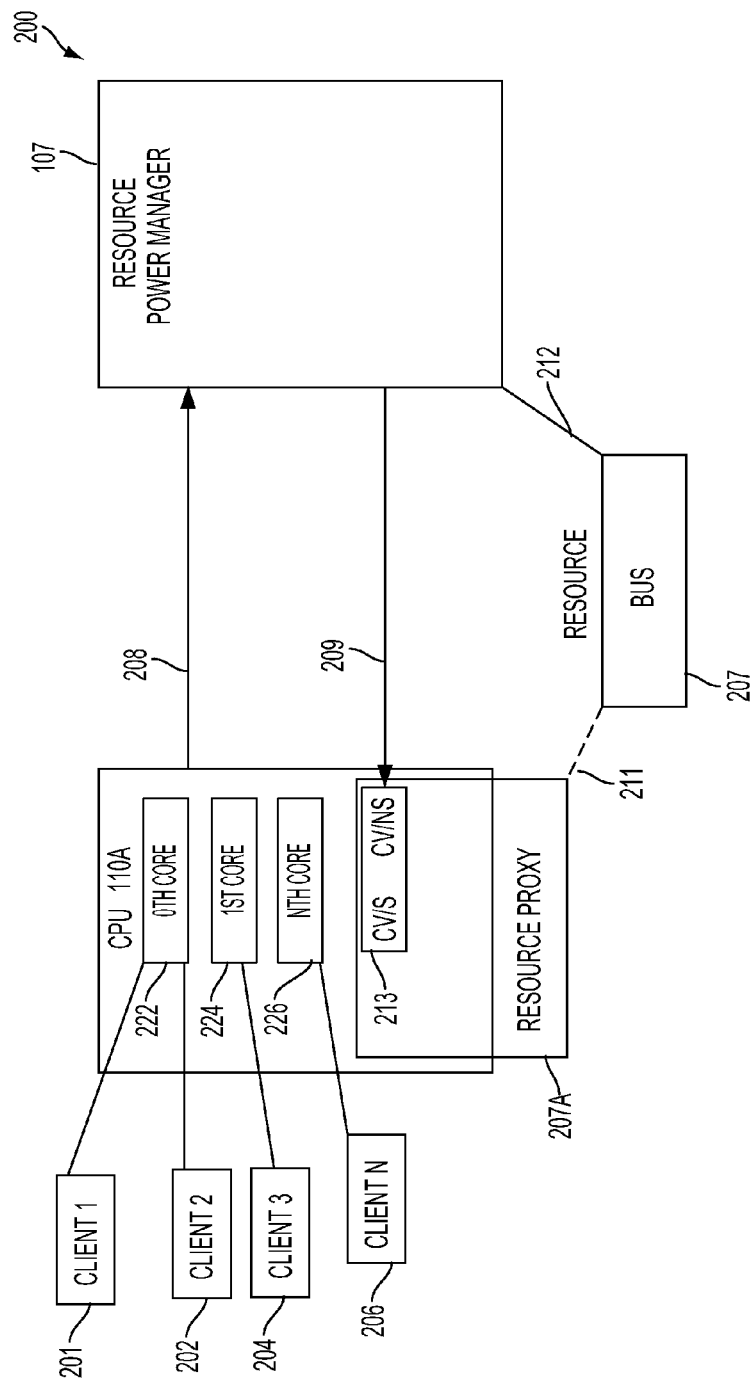
FIG. 2 is a functional block diagram illustrating an example operating environment for the method and system for managing parallel resource requests in a portable computing device.

FIG. 2 is a functional block diagram illustrating an example operating environment 200 for the method and system for managing parallel resource requests in a portable computing device. The operating environment 200 includes two processors, which, in this example, can be the CPU 110A and the resource power manager 107. A resource, which in this embodiment can be a system bus 207, is managed by the resource power manager 107. Another resource, which in this embodiment can be a resource proxy 207A for the system bus 207 is located on and managed by the CPU 110A. A resource proxy is defined as a local representation of a remote resource, whose state mirrors that of the remote resource.

In another embodiment, the resource proxy 207A may be substituted by a framework that serves as an interface between clients and resources, implemented as a library of functions on the CPU 110A. An example of such a framework is described below.

As described above, the CPU 110A comprises a 0th core 222, a first core 224 and an Nth core 226. However, the CPU 110A can also be a single core processor, where the CPU 110A would be the only processor. In the description to follow, while the CPU 110A comprises a plurality of cores, the CPU 110A will be referred to as a singular processor. Similarly, the resource power manager 107 may comprise one or more cores.

Each core on the CPU 110A may run one or more threads. A thread is a unit of execution on the processor and only one thread may be active at any given point in time on a given core. Clients are created and requests are issued in the context of one or more threads. In the below discussion, the terms client (or clients) and thread (or threads) are used interchangeably. When a client issues a request, it means that a client executing in the context of an active thread issued a request. Likewise, a client is said to be synchronous in the sense that it waits for a response to a request before proceeding, meaning that the thread in which the client issued a request is suspended until a response is received. Note that multiple clients can be created in the context of a single thread, but for the purposes of this description, only one client is active in a given thread at a given point in time.

In the example shown in FIG. 2, a first client 201 and a second client 202 are each running on the 0th core 222. A third client 204 is shown as running on the first core 224 and an Nth client 206 is shown as running on the Nth core 226. However, the coupling of the clients to the various cores is arbitrary and shown in FIG. 2 for illustrative purposes only. In an embodiment in which the CPU 110A is a single core processor, all of the clients would be running on the CPU 110A. Further, in the description to follow, any of the operative interactions between the clients and the various cores within the CPU 110A can also be described as occurring directly between the CPU 110A and the respective clients.

The CPU 110A is shown coupled to the system bus 207 by a dotted line 211 via the resource proxy 207A, while the system bus 207 is shown as coupled to the resource power manager 107 through a solid line 212. This connection topology is to indicate that the resource power manager 107 manages the system bus 207, while the CPU 110A has logical access to the system bus 207 via the resource proxy 207A, but does not actively manage it.

The resource proxy 207A is also shown as including a flag 213, which represents the state of a condition variable. A condition variable expresses or represents a certain condition that may or may not be true at a given point in time. The condition variable can be signaled to indicate that the condition expressed is currently true, and can be waited upon until the condition is true. In this example, the condition variable expressed by the flag 213 refers to whether a given request to the bus 207 was serviced or not. When the request is serviced, the condition variable is signaled (CV/S) (or the flag 213 is set) to indicate this state. Until then, the condition variable is not signaled (CV/NS). The operation of the flag 213 will be described in greater detail below.

Generally, the method and system for managing parallel resource requests in a portable computing device will be described using an example of any one of the clients 201, 202, 204 and 206 making a request of a resource, in this example, the system bus 207. Since the CPU 110A does not actively manage the system bus 207, it forwards the client request via the resource proxy 207A to the processor that manages the system bus 207. In this example, the processor that manages the system bus 207 is the resource power manager 107. Accordingly, a request from, for example, client 201 is sent from the CPU 110A to the resource power manager 107, as indicated by line 208. When the request is serviced, a reply, in the form of an interrupt is sent from the resource power manager 107 to the CPU 110A, as indicated by reference numeral 209. The interrupt sent from the resource power manager 107 to the CPU 110A is handled by an interrupt service routine (ISR) on the CPU 110A. The ISR will signal the condition of the variable flag 213, causing it to change state from "condition variable-not signaled" (CV/NS) to "condition variable-signaled" (CV/S). The effect of the interrupt will be described in greater detail below.

The operation of the method and system for managing parallel resource requests in a portable computing device will be described further with reference to FIGS. 3, 4, 5 and 6.

Figure 3:
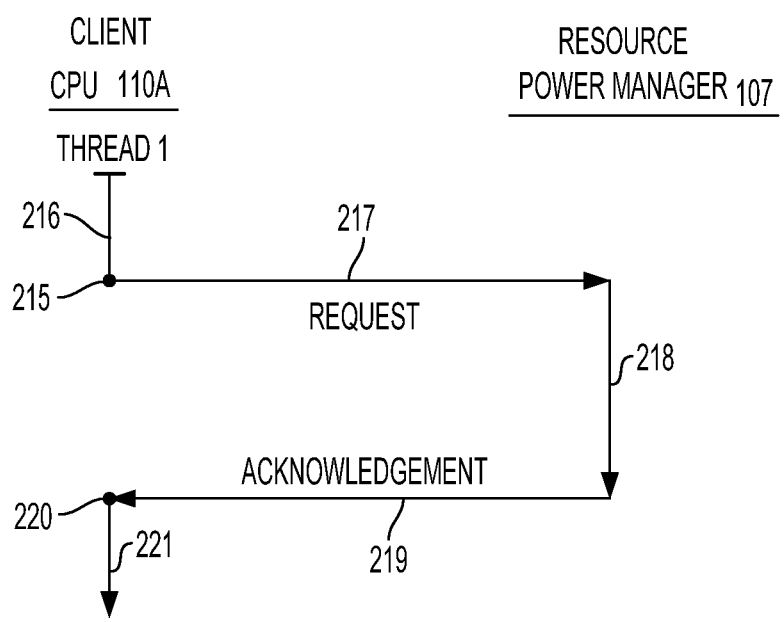
FIG. 3 is a diagram illustrating a synchronous thread running on a single resource.

FIG. 3 is a diagram illustrating a client running on a processor, in this example, the CPU 110A. At 216, the client is running and issues a resource request, which is forwarded by the resource proxy 207A on the CPU 110A to the resource power manager 107, as indicated by reference numeral 217. The request can be for any resource that is managed by the resource power manager 107. At point 215, the client ceases to run (or is suspended or blocked) on the CPU 110A, while the request is processed by the resource power manager 107, as indicated by reference numeral 218. Once the request is processed by the resource power manager 107, an acknowledgment (for example, in the form of an interrupt) is sent from the resource power manager 107 to the CPU 110A, as indicated by reference numeral 219, whereby at point 220 the client resumes running on the CPU 110A as shown by reference numeral 221. Such a request is referred to as a synchronous request because the client thread 216 running on the CPU 110A suspends at point 215 while the request is processed by the resource power manager 107, and does not resume until point 220 when the acknowledgment 219 is received by the CPU 110A. However, there are some instances in which it is desirable for the client to perform some other work during the time it is waiting for the request to be processed. It is also possible that the client does not need to wait for the acknowledgement from the resource power manager 107 and can simply continue running Such a request may be called a "fire-and-forget" request. An example of a fire-and-forget request would be a request in which the client is turning off a resource. The client (and by extension, the thread the client is running in) does not have to wait until this action is complete before continuing. An example of such a methodology is described in FIG. 4.

Figure 4:
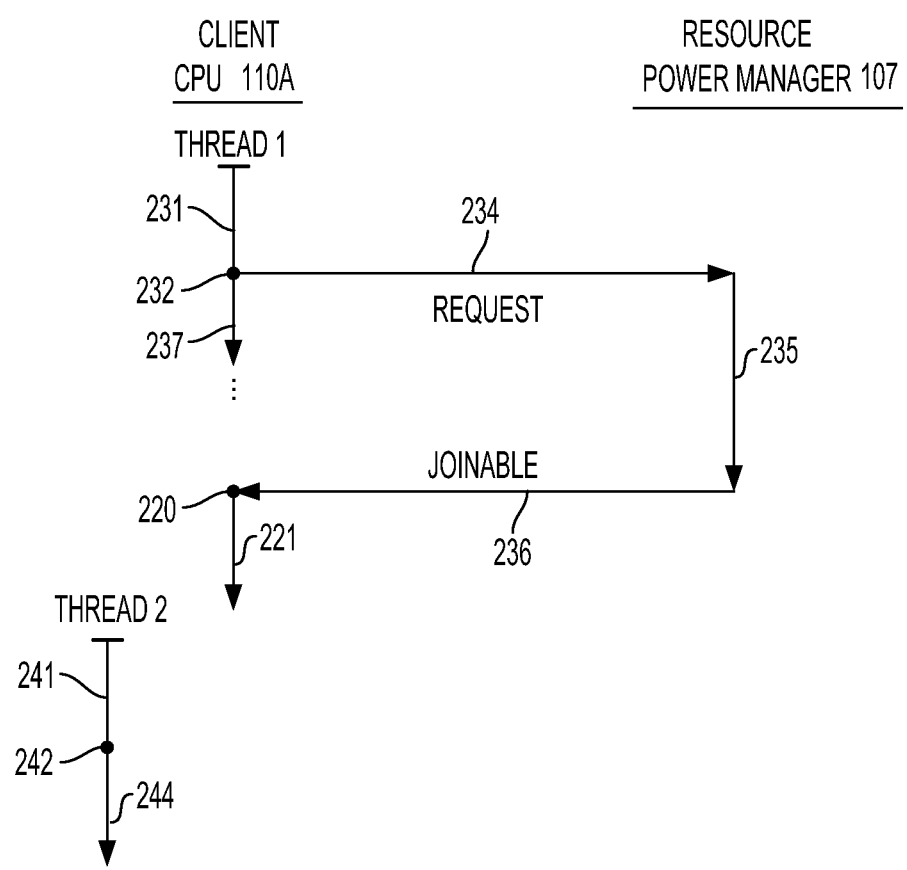
FIG. 4 is a diagram showing the operation of an embodiment of the method and system for managing parallel resource requests in a portable computing device.

FIG. 4 is a diagram showing the operation of an embodiment of the method and system for managing parallel resource requests in a portable computing device. In FIG. 4, a first thread 231 is begun in the CPU 110A. At point 232, a request from a client in this thread is forwarded by the resource proxy 207A, from the CPU 110A to the resource power manager 107. In an embodiment, the request can be from, for example, the first client 201 requesting a certain amount of bandwidth on the system bus 207. For example, the system bus 207 may be operating at a bandwidth of 100 megabits per second (MB/s), but the client 201 would like it to operate at 200 MB/s. Therefore, the request indicated by reference numeral 234 is a request to the resource power manager 107, which manages the system bus 207, for additional bandwidth on the system bus 207 to allow the first client 201 to operate at the higher bandwidth.

At point 232, the request is forwarded from the resource proxy 207A on the CPU 110A to the resource power manager 107. However, since the first client 201 doesn't have to wait until the available bandwidth on the system bus 207 is increased to continue operating (the first client 201 can run at the lower bandwidth until the resource power manager 107 increases the bandwidth available on system bus 207, at which point the first client 201 automatically begins to use the higher bandwidth), the first client 201 can indicate this to the resource proxy 207A on CPU 110A, by passing in a preference.

The preference can be specified by the first client 201 and determines whether the resource can be forked to allow parallel, or asynchronous, processing. Examples of preferences include, but are not limited to, ALLOWED, DISALLOWED and DEFAULT. The preferences ALLOWED and DISALLOWED explicitly allow or disallow parallel processing as described above. The preference DEFAULT informs the resource that the client allows the resource to make its own decision on whether to fork or not, so long as it does not impact client behavior. For example, if the preference DEFAULT is specified, the resource may choose to fork all requests that turn OFF a resource or cancel a previously required request. A request to turn OFF a resource or cancel a previous request usually indicates that the client is not interested in the state of the resource following such a request and the resource can fork this request and return to the client immediately. However, if the request were for a specific value and the preference is DEFAULT, it cannot fork such a request as the client may expect the resource to be in (at least) this particular state before control returns to the client.

The preference is used by the resource proxy 207A on the CPU 110A to forward the request to the resource power manager 107 in an asynchronous fashion, such that the first client 201 or the thread it is running in is not suspended while the request is serviced. In such an instance, the CPU 110A continues to be available to execute the thread begun at 231 and operate as indicated by reference numeral 237. When a resource request is thus issued but not yet serviced or the request was issued and serviced, but the new state not yet acknowledged by the resource proxy 207A on CPU 110A or visible to clients (i.e. if a client were to query the state of the resource, it would still "see" the old state), the request and resource are marked "forked." The terminology "forked" refers to a condition in which the resource is in an incoherent state, in the sense that the last request to the resource was issued, but is not yet serviced or if serviced, the resources' local representation, as maintained by the resource proxy 207A, is not yet updated to the new state. The resource proxy 207A may also register a callback to be invoked after the request is actually serviced. In this callback, the resource proxy 207A can choose to perform other actions that depend on the resource being in the new (requested) state. For example, it is possible that a clock resource (not shown) should be set to a new value after the bandwidth of the system bus 207 is increased. In such a case, the resource proxy 207A will issue the request to the clock resource (not shown) in the callback, thus ensuring that the request to the clock resource (not shown) is executed only after the request to the system bus 207 is serviced. Simultaneously therewith, the resource power manager 107 processes the request as indicated by reference numeral 235 and sends an acknowledgment to the CPU 110A, indicated at reference numeral 236. The acknowledgement 236 corresponds to an interrupt communicated over connection 209 (as shown in FIG. 2). The interrupt service routine (ISR) that handles/services this interrupt on the CPU 110A sets the condition variable associated with the flag 213 to the "signaled" status, i.e., CV/S. This action indicates that the subject resource is now "joinable." The terminology "joinable" refers to a condition in which the resource, e.g., the system bus 207, has serviced the request, has moved to a new state and has indicated this new state to the resource proxy 207A on the requesting processor. When a subsequent request of the system bus 207 is issued by one of the clients 201, 202, 204 and 206 on the CPU 110A, the resource is "joined". The terminology "joined" refers to an action in which the resource proxy 207A updates the local representation of the resource (in this example, the system bus 207) to the new state, thus rendering the resource coherent and able to service the new request. The resource proxy 207A will also execute any callbacks it has registered at a fork, as described above. It will then handle the new request.

As further shown in FIG. 4, a second client executing in the thread indicated at reference numeral 241, or the same client 201 executing in a new thread, makes a new request to the system bus 207, at point 242. So, at point 242, the resource (in this example, the system bus 207 and its local resource proxy 207A) is "joined," which is possible because the condition variable associated with the flag 213 is set (CV/S) and marks the resource "joinable," as described above. If at point 242, when the second request arrives at the resource proxy 207A, the system bus 207 is not yet "joinable," the request and the thread it is executing in will block until the interrupt from the resource power manager 107 marks the resource as "joinable." Processing in this new thread then continues as indicated by reference numeral 244.

Figure 5:
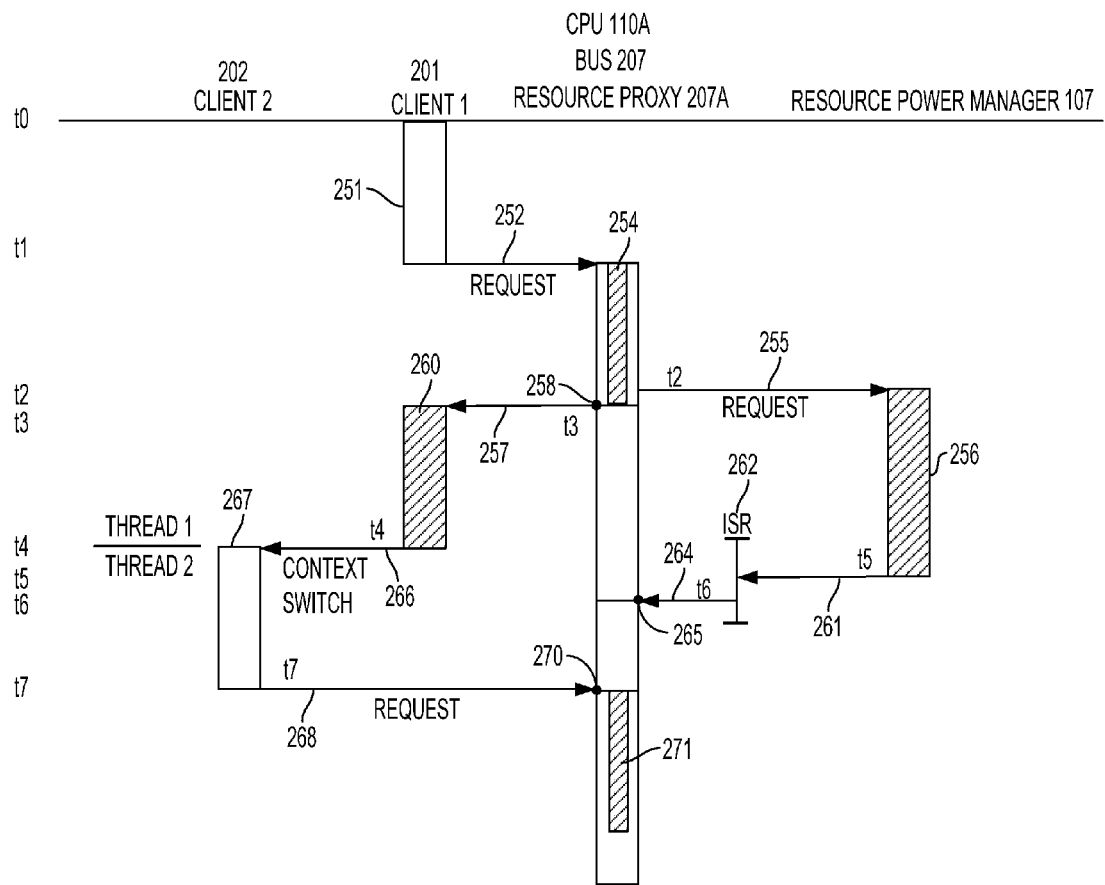
FIG. 5 is a timeline diagram showing the operation of an embodiment of the method and system for managing parallel resource requests in a portable computing device.

FIG. 5 is a timeline diagram showing the operation of an embodiment of the method and system for managing parallel resource requests in a portable computing device. At time t0, the first client 201, running on CPU 110A, begins work as illustrated using reference numeral 251. At time t1, the first client 201 issues a request for a remote resource, such as the system bus 207, via a local resource proxy 207A, as indicated at reference numeral 252. The request is received at the local resource proxy 207A and begins being performed on the CPU 110A as illustrated using reference numeral 254. At time t2, the resource proxy 207A forwards the request to the second processor (the resource power manager 107), as illustrated using reference numeral 255. When the request is received by the resource power manager 107, the resource power manager 107 begins executing and processing the request as illustrated using reference numeral 256. In accordance with an embodiment of the method and system for managing parallel resource requests in a portable computing device, assuming that the first client 201 allowed 'forking' of the request, at time t3, the resource proxy 207A processes the request in an asynchronous fashion (i.e., by issuing the request to the remote processor (the resource power manager 107), but not waiting until the request is serviced and acknowledged) and returns to the first client 201, as indicated using reference numeral 257. The first client 201 now continues work as indicated using reference numeral 260. As shown in the timeline, the work performed by the first client 201 during the period indicated at 260 occurs in parallel with the work performed by the resource power manager 107 during the time period indicated by 256. The point 258 at which the request is returned by the resource proxy 207A to the first client 201 is referred to as the "fork" point. The fork point indicates that at point 258, the resource or request forks to allow parallel processing simultaneously in the resource power manager 107 and in the client 201.

At time t4, a context switch to a second thread occurs as indicated using reference numeral 266. At time t5, the resource power manager 107 send an interrupt, as indicated using reference numeral 261, to the resource proxy 207A on CPU 110A. The interrupt service routine (ISR) that handles this interrupt in the CPU 110A sets the condition variable flag 213 (FIG. 2) to the "signaled" (CV/S) status as indicated using reference numeral 264. At point 265, the system bus 207 is considered to be "joinable" and available to process subsequent requests.

At time t7 the second client 202, executing in the second thread on CPU 110A, issues a request to the system bus 207 via the resource proxy 207A as indicated using reference numeral 268. The request 268 can be considered to be a "subsequent" request from the perspective of the system bus 207. When the subsequent request is received, the resource proxy 207A checks and determines that the system bus 207 is in a joinable state and can be "joined." At point 270, the system bus 207 is joined in the context of the second thread. This means that the system bus 207 is considered "joinable" at point 265, but is "joined" at point 270, in order to process the subsequent request 268 in the second thread from the second client 202. The resource (in this example, the system bus 207) thus can be in one of three states—forked, joinable, and joined. From the point the resource is forked, it is considered to be in an incoherent state, meaning that the request was received but not yet processed or if processed, the local representation of the resource is not yet updated with the actual (new) resource state. In such a state, the resource cannot process subsequent requests. Therefore, the resource is "joined," i.e., rendered coherent at point 270, before it can process the subsequent request 268. The time period indicated at 271 illustrates the time during which the subsequent request 268 from second client 202 is processed by the resource proxy 207A. Note that this request may also "fork," repeating the sequence described above.

It should be mentioned that the subsequent request need not come from a different client, but, in an embodiment, can also come from the first client 201 in the form of a subsequent request. Importantly, any client of the system bus 207 can initiate the subsequent request and consequently "join" at time t7. The previous request which was issued in the context of the first client 201 (and in this embodiment, in a different thread) is thus "completed" (in the sense of updating the local resource representation (the resource proxy 207A) to the new state and thus making the resource (the system bus 207) coherent again) during the processing of the subsequent request, which may, as mentioned above, come from any client on any thread on the CPU 110A. This occurs with no additional management and any request to the system bus 207 can bring the resource back to availability and action at point 270.

Figure 6A:
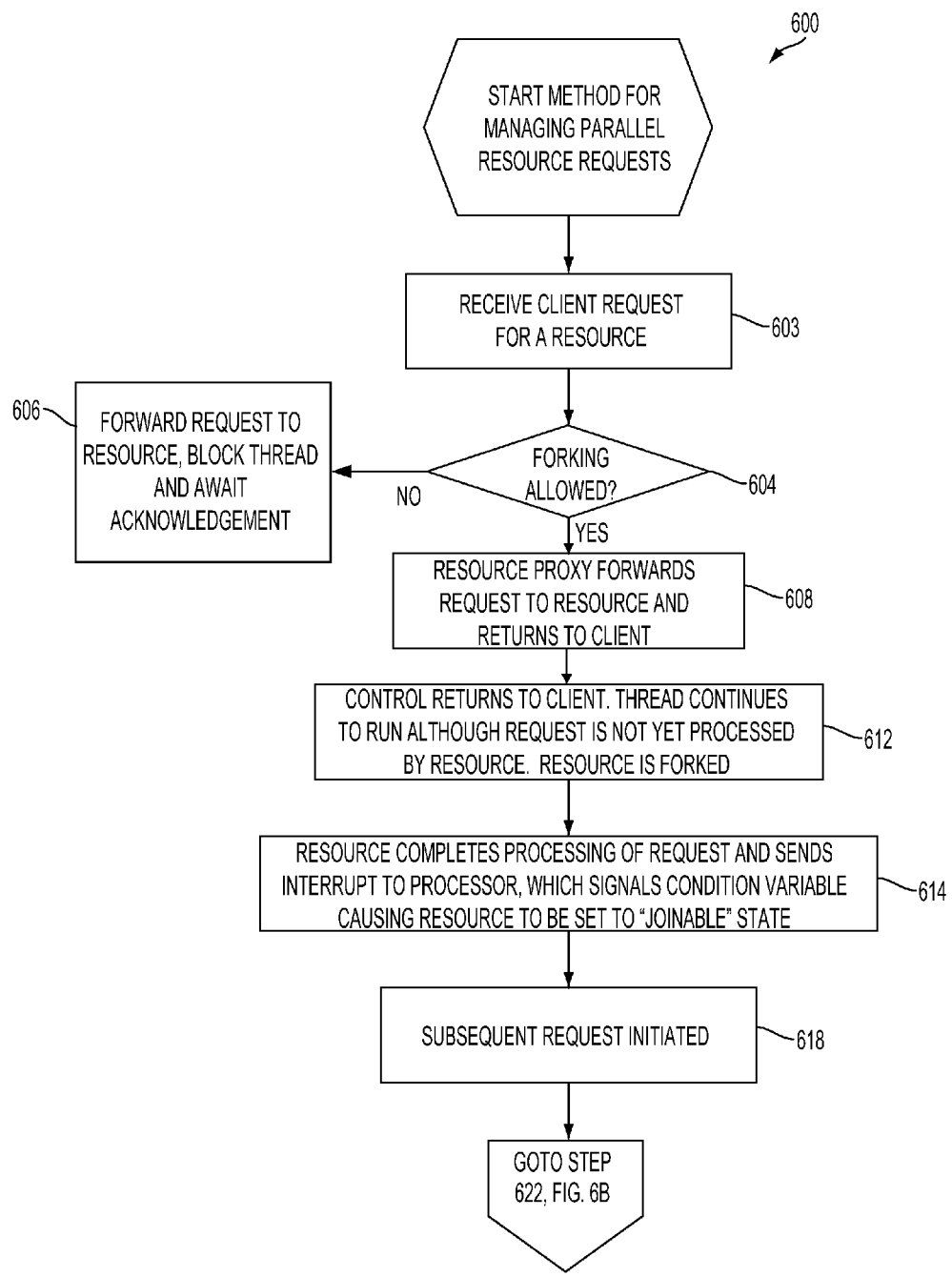
FIGS. 6A and 6B collectively illustrate a flowchart describing the operation of an embodiment of the method and system for managing parallel resource requests in a portable computing device.
Figure 6B:
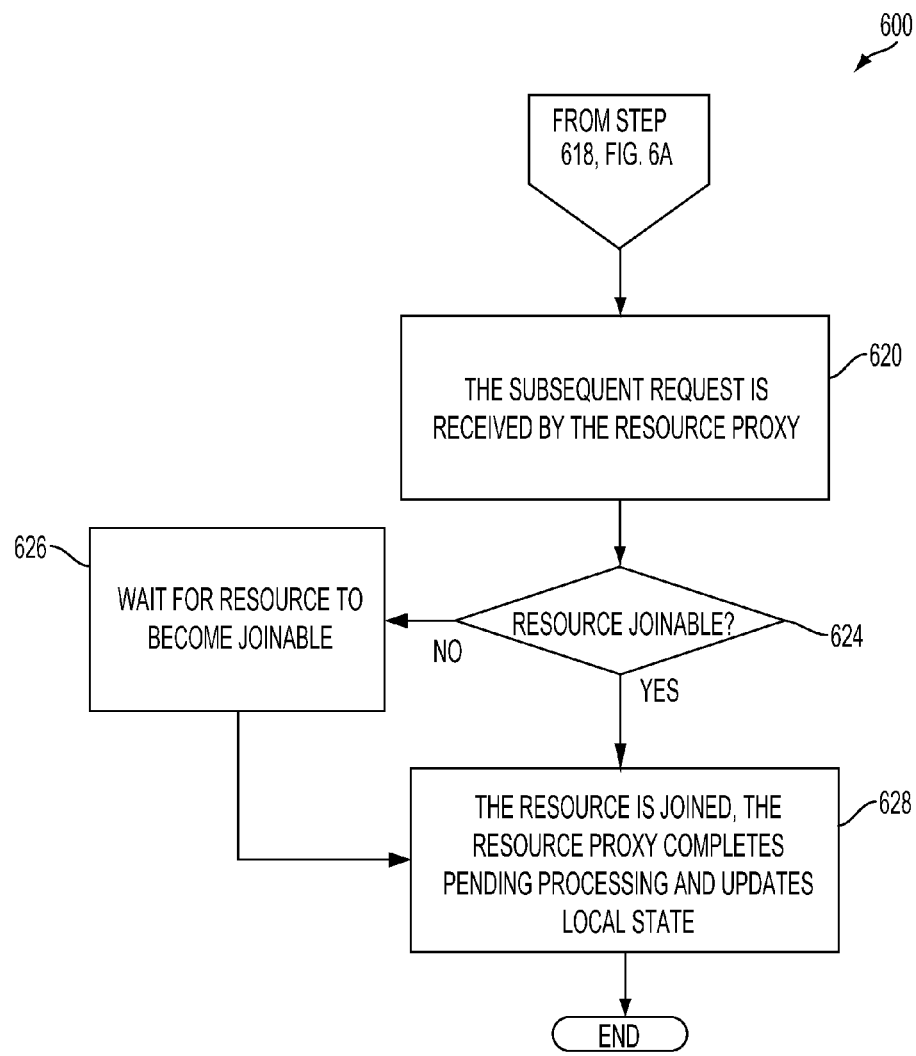

FIGS. 6A and 6B collectively illustrate a flowchart describing the operation of an embodiment of the method and system for managing parallel resource requests in a portable computing device. In block 603 a request for a resource is received. In the example above, the request is received by the resource proxy 207A. However, the request can be received by another entity. In this embodiment, the first client 201 makes a request for the system bus 207 that is managed by a remote processor, such as the resource power manager 107. In the example described, the request is made via a local resource proxy 207A on CPU 110A.

In block 604 it is determined whether the first client 201 that issued the request wishes this request to complete synchronously or whether the first client 201 allows the resource proxy 207A to "fork" this request and return immediately to the first client 201. If the first client 201 has disallowed forking and desires the resource request to be completed synchronously, in block 606, the resource proxy 207A forwards the request to the resource power manager 107, blocks the processing thread, and waits until the resource power manager 107 services the request.

In block 608, if the first client 201 has allowed the request to fork, the resource proxy 207A forwards the request to the resource power manager 107 and returns to the client immediately, without waiting for the request to be serviced.

In block 612, control returns to the first client 201 and the thread continues to run, despite the request having not yet been serviced by the resource power manager 107. The resource is marked forked and needs to be joined before it can service any subsequent request.

In block 614, the resource power manager 107 completes processing of the request and sends an interrupt to the CPU 110A indicating this. The interrupt service routine (ISR) on CPU 110A, which handles this interrupt, signals the condition variable, flag 213 set to (CV/S), causing the resource to be set into the 'joinable' state. The step described in block 614 may occur in series as illustrated, in parallel, or at any time after the step described in block 612 and before the step described in block 628.

In block 618, a subsequent request is initiated. The subsequent request may be initiated in the same thread or in a second thread. In addition, the subsequent request may be initiated by the same client or by a different client. In this example, the subsequent request is initiated by a different client, i.e., the second client 202 in a different thread.

In another embodiment, the subsequent request may be initiated from the same thread as the first request. Since the processing in the initial thread was not blocked by the first request, the initial thread may do other work and then place a subsequent request on the resource. For example, a thread may issue a request to turn off a remote resource, which is forked by the local resource proxy. After a period of time, the thread (or more specifically, a client in the thread) may want to turn on the resource. In such a case, the subsequent request is initiated in the same thread.

In block 620, the subsequent request is received at the resource proxy 207A.

In block 624, it is determined whether the resource (the system bus 207) is joinable. If it is determined in block 624 that the resource is not joinable, then the process proceeds to block 626 where the thread waits until the resource is joinable. If it is determined in block 624 that the resource is joinable, or after the resource becomes joinable in block 626, the process proceeds to block 628 where the resource is "joined," the resource proxy 207A completes any pending processing from the previous forked request and updates the local representation of the resource to the new state. In this manner, the resource is moved to the 'joined' state. The resource now begins to process the second request.

An alternative to the implicit join that ensues when a subsequent request arrives on a resource in the "forked" or "joinable" state is known as an "explicit join." As described above, a forked resource joins implicitly whenever a subsequent request to the resource arrives at the resource proxy (or the framework). However, there may be instances when a client wishes to explicitly join the resource without issuing a subsequent request. In such a case, a means by which a forked resource may be joined and rendered coherent is referred to as an "explicit join." Such an explicit join operation will await the condition variable being signaled, update the local resource representation to mirror the new resource state and return to client. The client will be suspended until this call returns.

An alternative to "forked" requests to remote resources is forked 'local' resources/requests. In the example above, it is assumed that the request is serviced remotely and that the client (or caller) wishes to perform other operations on the requesting processor or perhaps yield to other clients or other threads to perform other operations, while its request is serviced. This need not always be the case. Consider a scenario where a request is serviced by another thread on the CPU 110A. In such a case, the client issues a request to this resource which is picked up by the other thread (whenever it is scheduled by the operating system), serviced and an acknowledgement returned to the calling thread. It is possible to apply the method and system above to this scenario by replacing the remote processor with this request processing thread.

An alternative to the "join" is referred to as the "eager join" state. In the embodiment discussed above, forked resources are joined implicitly when a subsequent request arrives at the resource (or its proxy) or explicitly when a client requests it. In another embodiment, there can be multiple worker threads created for the express purpose of joining a 'joinable' resource, independent of a subsequent request or an explicit join. In such a scenario, the ISR that receives notice of completion from the remote processor will not only signal the condition variable and mark the resource "joinable," but will also put the join action (the join callback) as a work item on a queue. The worker threads that are waiting on the queue will see this work item, pick it up and execute it in their contexts; ensuring that the join action is performed and the resource set to the 'joined' state as soon as possible.

As mentioned above, in an alternative embodiment, the interface between the client and the resource may be a framework, instead of a resource proxy. The design and structure of such a framework is discussed below.

Figure 7A:
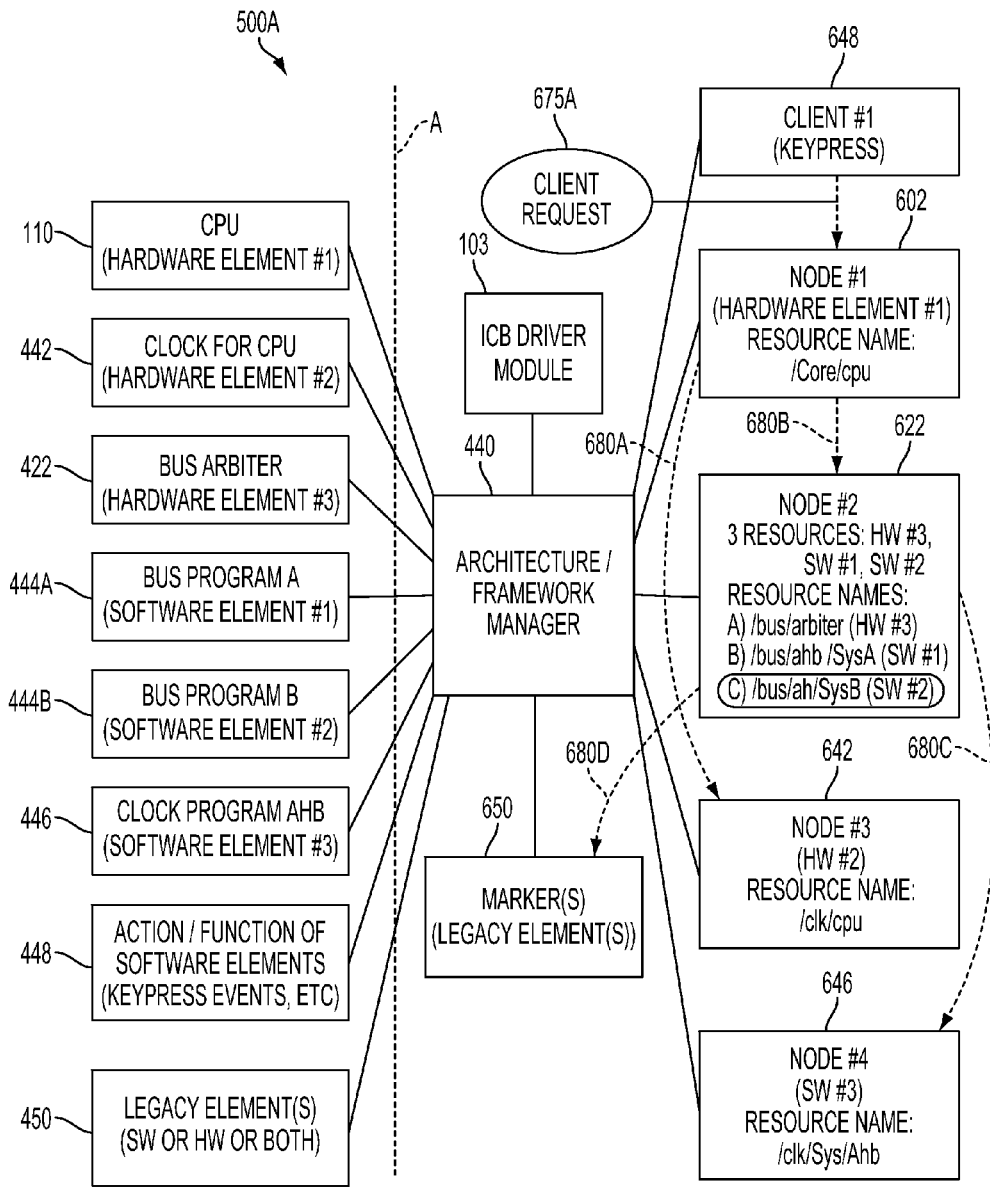
FIG. 7A is a diagram of a first aspect of a node architecture that manages resources of a portable computing device of FIG. 1.

FIGS. 7A-10 as described below are provided to describe how the node architecture of FIG. 2 is established and maintained. FIG. 7A is a diagram of a first aspect of a software architecture 500A for establishing and maintaining the node architecture that is illustrated in FIG. 4.

FIG. 7A is a diagram comprising functional blocks which represent software or hardware (or both). FIG. 7A illustrates an architecture or framework manager 440 that is coupled to a plurality of hardware and software elements, such as, but not limited to: the ICB driver module 103; the central processing unit 110, also referred to generally as the first hardware element (hardware element #1); a clock 442 for the CPU 110, also referred to generally as the second hardware element (hardware element #2); a bus arbiter or scheduler 422, also referred to generally as the third hardware element (hardware element #3); a bus program A-444A, also referred to generally as the first software element (software element #1); a bus program B-444B, also referred to generally as the second software element (software element #2); a clock program AHB, referred to generally as the third software element (software element #3); an action or function monitored by a software element generally indicated as a keypress 448; and a legacy element 450 comprising a software element or a hardware element or both.

An example of a legacy software element may include, but is not limited to, a Dynamic Environment Manager (DEM). This is a software module that handles interprocessor notification of processor sleep events. For example, a first processor A uses the DEM to receive a notification that a second processor B has gone idle/come back from idle. On newer hardware, this software functionality has been subsumed into the route processor module (RPM) subsystem/communication protocol. Other legacy software elements exist and are included within the scope of the invention.

An example of a legacy hardware element may include, but is not limited to, an AMBA (Advanced Microcontroller Bus Architecture) High-performance Bus (AHB). On older PCDs 100. The AHB may comprise the primary system bus, whereas on newer PCDs 100, the system bus fabric 107 is completely different and the AHB bus is only used for special applications to communicate with modules that have not yet been updated to communicate via the new system bus fabric. Other legacy hardware elements exist and are included within the scope of the invention.

The framework manager 440 may comprise a library of computer instructions that manages data structures, such as nodes which communicate with each of the aforementioned hardware and software elements. The framework manager 440 may be responsible for creating one or more resources that may form nodes 602, 622, 642, and 646 as illustrated on the right side of the dashed line A of FIG. 7A.

Figure 7B:
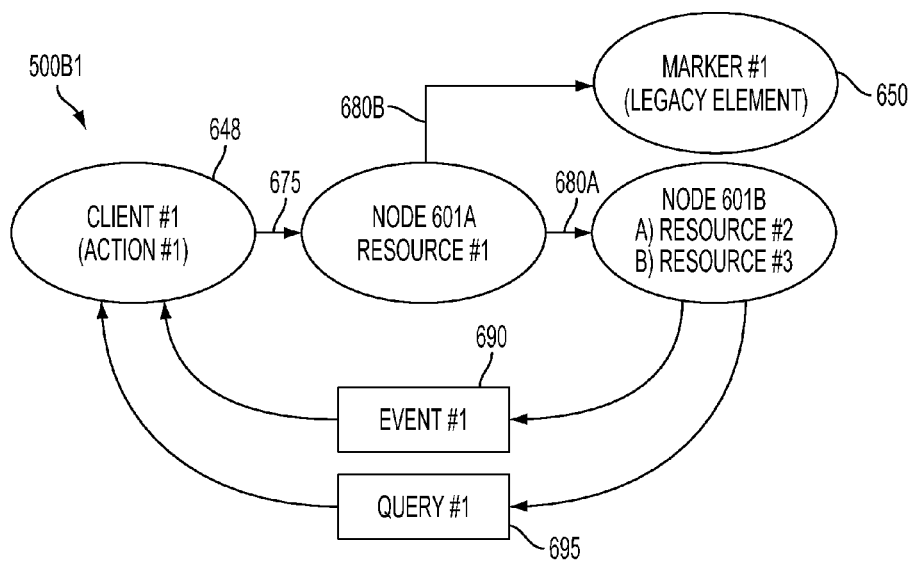
FIG. 7B is a general diagram of a second aspect of the node architecture that manages resources of a portable computing device of FIG. 1.

The framework manager 440 may communicate directly with each ICB driver module 103 residing on a CPU 110. Each node 602, 622, 642, and 646 on the right side of FIG. 7A is a representation or model of each software or hardware element on the left hand side of the dashed line A of FIG. 7A. For the remainder of this disclosure, a general or non-specific node will be designated with reference numeral 601 as illustrated in FIG. 7B.

As noted previously, each exemplary node 602, 622, 642, and 646 of FIG. 7A may comprise one or more resources. A resource may comprise a software element or hardware element or both. For example, a first node 602 comprises a single resource that generally corresponds with the first hardware element or central processing unit 110. With the software architecture described in this disclosure, each resource of a node 601 may be provided with a unique name comprising one or more alphanumeric characters. In the exemplary embodiment illustrated in FIG. 7A, the resource of the first node 602 has been assigned the resource name of "core/cpu." This exemplary resource name generally corresponds to conventional file naming structures known to one of ordinary skill in the art. However, as recognized by one of ordinary skill the art, other types of resource names containing any other combination of alpha-numeric characters and/or symbols are well within the scope of the invention.

In the exemplary embodiment of FIG. 7A, the second node 622 comprises a plurality of resources. Specifically, in this particular exemplary embodiment, the second node 622 has a first resource comprising a single hardware element corresponding to the bus arbiter or scheduler 422. The second resource of the second node 622 comprises a software element generally corresponding to the first software element of the bus program A 444A. The third resource of the second node 622 comprises another software element generally corresponding to the second software element of the bus program B 444B. One of ordinary skill the art recognizes that any combination and any number of resources and resource types for a given node 601 are well within the scope of the invention.

In addition to creating nodes 601, the framework manager 440 may also create or instantiate markers 650. A marker may comprise one or more legacy elements, such as a hardware element or software element (or both as well as a plurality of these elements), that do not easily map themselves or are not readily compatible with the software architecture managed by the framework manager 440. A marker 650 can support a resource of a node 601 meaning that a resource of a node 601 may be dependent on a marker 650. One example of a marker 650 may include a string driver. A string driver may not easily fit within the architecture described in connection with FIG. 7A. A marker 650 may be referenced by a node 601 and its dependency array data collected in block 1125 of FIG. 8.

FIG. 7A also illustrates a first client 648 that generally corresponds to an action or function of the two software elements 448, 450. In the exemplary embodiment illustrated in FIG. 7A, the first client 648 generally corresponds to a keypress action that may occur within a particular application program module 105 supported by the portable computing device 100. However, one of ordinary skill in the art recognizes that other actions and/or functions of software elements besides keypresses are well within the scope of the invention. Further details about client requests 648 and their respective creation will be described below in connection with FIG. 10.

FIG. 7A also illustrates relationships between particular architectural elements. For example, FIG. 7A illustrates a relationship between the client 648 and the first node 602. Specifically, the first client 648 may generate a client request 675A, illustrated with dashed lines, which is managed or handled by the first node 602 that comprises the resource "/core/cpu." Typically, there are a predetermined or set number of types of client requests 675. Client requests 675 will be described in further detail below in connection with FIG. 10.

Other relationships displayed in FIG. 7A include dependencies illustrated with dashed lines 680. Dependencies are relationships between respective resources of another node 601. A dependency relationship usually indicates that a first resource (A) is reliant upon a second resource (B) that may provide the first resource (A) with information. This information may be a result of an operation performed by a second resource (B) or it may simply comprise status information that is needed by the first resource (A) or any combination thereof. The first resource (A) and second resource (B) may be part of the same node 601 or they may be part of different nodes 601.

In FIG. 7A, the first node 602 is dependent upon the second node 622 as indicated by the dependency arrow 680B which originates with the first node 602 and extends to the second at 622. FIG. 7A also illustrates that the first node 602 is also dependent upon the third node 642 as illustrated by the dependency arrow 680A. FIG. 7A also illustrates that the second node 622 is dependent upon the fourth node 646 as illustrated by the dependency arrow 680C. One of ordinary skill in the art recognizes that the dependencies 680 illustrated with the dashed arrows of FIG. 7A are only exemplary in nature and that other combinations of dependencies between respective nodes 601 are within the scope of the invention.

The architecture or framework manager 440 is responsible for maintaining the relationships described above, that include, but are not limited to the client requests 675 and the dependencies 680 illustrated in FIG. 7A. The framework manager 440 will try to instantiate or create as many nodes 601 as it can as long as the dependencies 680 for any given node 601 are complete. A dependency 680 is complete when a resource which supports a dependency is in existence or is in a ready state for handling information that relates to the dependency 680.

For example, the first node 602 comprising the single resource "/core/cpu" may not be created or established by the framework manager 440 if the third node 642 comprising the single resource "/clk/cpu" has not been created because of the dependency relationship 680A that exists between the first node 602 and the third node 642. Once the third node 642 has been created by the framework manager 440, then the framework manager 440 may create the second node 602 because of the dependency relationship 680A.

If the framework manager 440 is unable to create or instantiate a particular node 601 because one or more of its dependencies 680 are incomplete, the framework manager 440 will continue running or executing steps corresponding to those nodes 601 that were created successfully by the framework manager 440. The framework manger 440 will usually skip over a call for a particular node 601 which may not exist due to incomplete dependencies in which dependent resources have not been created and return messages to that call which reflect that incomplete status.

In a multicore environment, such as illustrated in FIG. 1, the framework manager 440 may create or instantiate nodes 601 on separate cores, like the 0th, first and Nth cores 222, 224, and 226 of FIG. 1. Nodes 601 may generally be created in a multicore environment on separate cores and in parallel as long as the nodes 601 are not dependent on one another and if all of a particular node's corresponding dependencies, as described below, are complete.

FIG. 7B is a general diagram of a second aspect of the software architecture 500B1 for a system that manages resources of a PCD 100 of FIG. 1. In this general diagram, the one or more resources of each node 601 have not been provided with unique names. The node or resource graph 500B1 of FIG. 7B comprises only the nodes 601, markers 650, clients 648, events 690, and query functions 695 supported by the architecture or framework manager 440. Each node 601 has been illustrated with an oval shape and arrows 680 with specific directions which represent respective dependencies between resources within a node 601.

Calls within the node architecture illustrated in FIGS. 7A-B may be made to an alias, or an actual resource name of a resource within a node 601. According to one exemplary embodiment, there is not a way to make a client request 675 against a marker 650 since there is no interface between clients 648 and markers 650 so this generally means information exchanged with markers 650 usually originates from a node 601 or resource and not a client 648.

For example, the first node 601A of FIG. 7B has a dependency arrow 680A to indicate that the first node 601A is dependent upon the two resources (resources #2 and #3) of the second node 601B. Similarly, the first node 601A has a dependency arrow 680B to indicate that the first node 601A is also dependent upon the first marker 650 which typically comprises a legacy element of hardware or software or a combination thereof.

FIG. 7B also illustrates how a client 648 of the first node 601A may issue a client request 675 to the first node 601A. After these client requests 675 are issued, the second node 601B may trigger an event 690 or provide a response to a query 695, in which messages corresponding to the event 690 and the query 695 flow back to the client 648.

Figure 7C:
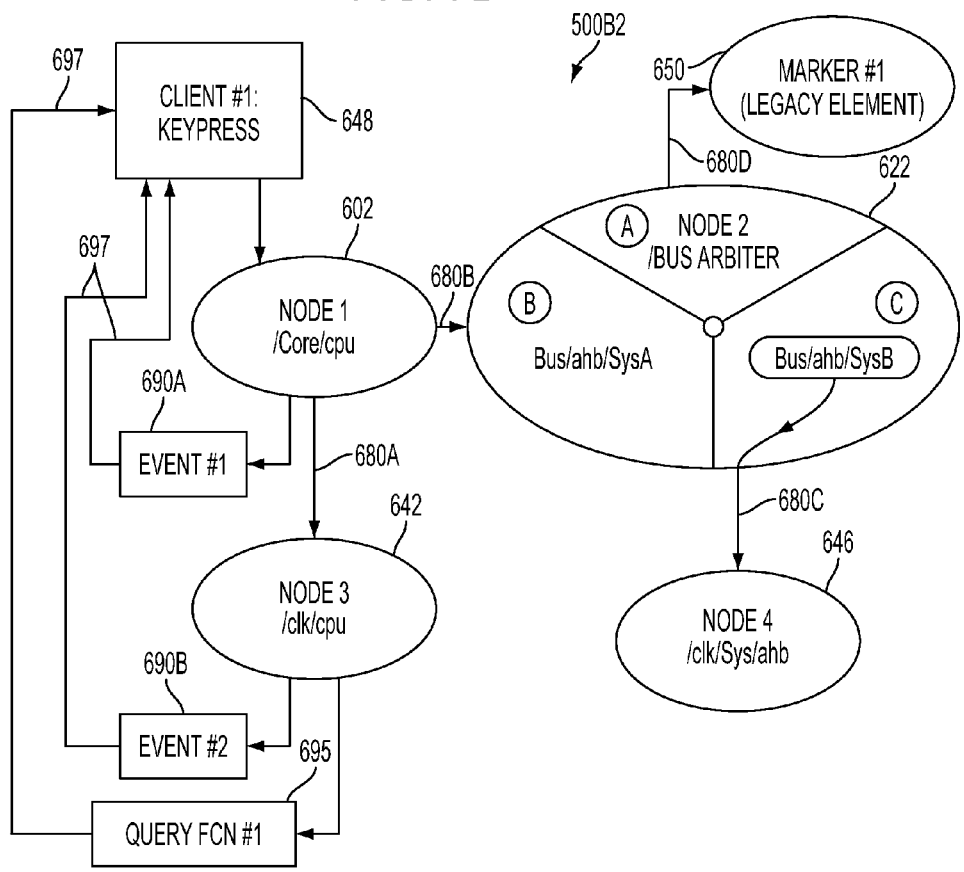
FIG. 7C is specific diagram of a second aspect of the node architecture that manages resources of a portable computing device of FIG. 1.

FIG. 7C is a specific diagram of a second aspect of the software architecture 500B2 for a system that manages resources of a PCD 100 of FIG. 1. FIG. 7C illustrates a node or resource graph 500B2 that comprises only the nodes 601 with specific, yet exemplary resource names, as well as clients 648, events 690, and query functions 695 corresponding to those of FIG. 7A. Each node 601 has been illustrated with an oval shape and arrows 680 with specific directions which represent respective dependencies between resources within a node 601.

For example, the first node 602 has a dependency arrow 680B to indicate that the first node 602 is dependent upon the three resources of the second node 622. Similarly, the third resource "/bus/ahb/sysB/" comprising the second software element 444B and generally designated with the reference letter "C" in FIG. 7C has a dependency arrow 680C that indicates this third resource (C) is dependent upon the single "/c1k/sys/ahb" resource of the fourth node 646.

FIG. 7C also illustrates the output data from nodes 601 which may comprise one or more events 690 or query functions 695. A query function 695 is similar to an event 690. The query function 695 may have a query handle that may or may not be unique. The query function is generally not externally identified and generally it does not have a state. The query function 695 may be used to determine the state of a particular resource of a node 601. The query function 695 and the events 690 may have relationships with an established client 648 and these relationships are represented by directional arrows 697 to indicate that information from respective event 690 and query function 695 are passed to a particular client 648. FIG. 7C also illustrates how the second node 622 of FIG. 7C is dependent upon the first marker 650 via dependency arrow 680D.

The node or resource graphs 500B of FIG. 7B-7C represent relationships that exist in memory and which are managed by the framework manager 440 and related data structures that may comprise the nodes 601. The node or resource graph 500B can be automatically generated by the framework manager 440 as a useful tool for identifying relationships between respective elements managed by the framework manager 440 and for troubleshooting by a software team.

Figure 7D:
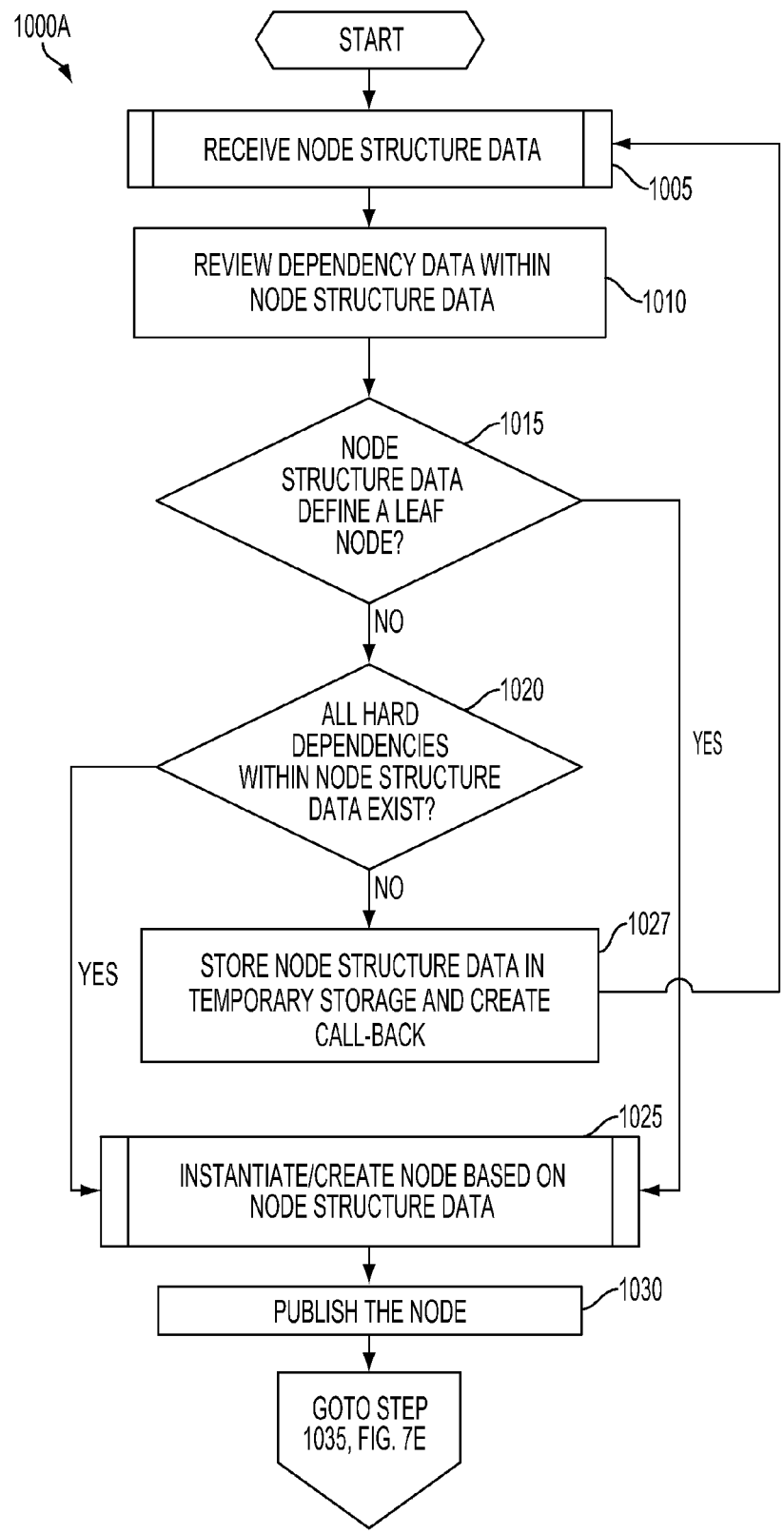
FIG. 7D is a flowchart illustrating a method for creating a node architecture for managing resource(s) of a portable computing device.

FIG. 7D is a flowchart illustrating a method 1000A for creating a software architecture for managing resource(s) of a PCD 100. Block 1005 is the first routine of the method or process 1000 for managing resources of a PCD 100. In routine block 1005, a routine may be executed or run by the framework manager 440 for receiving node structure data. The node structure data may comprise a dependency array that outlines the dependencies a particular node 601 may have with other nodes 601. Further details about node structure data and this routine or submethod 705 will be described in more detail below in connection with FIG. 8.

Next, in block 1010, the framework manager 440 may review the dependency data that is part of the node structure data received in block 1005. In decision block 1015, the framework manager 440 may determine if the node structure data defines a leaf node 601. A leaf node 601 generally means that the node to be created based on the node structure data does not have any dependencies. If the inquiry to decision block 1015 is positive, meaning that the node structure data for creating the current node does not have any dependencies, then the framework manager 440 continues to routine block 1025.

If the inquiry to decision block 1015 is negative, then the "No" branch is followed to decision block 1020 in which the framework manager determines if all of the hard dependencies within the node structure data exist. A hard dependency may comprise one in which a resource cannot exist without it. Meanwhile, a soft dependency may comprise one in which a resource may use the dependent resource as an optional step. A soft dependency means that a node 601 or resource of the node 601 which has a soft dependency may be created or instantiated within the node architecture even when the soft dependency does not exist. A marker 650 may be referenced as a soft dependency as described above.

An example of a soft dependency may comprise an optimization feature that is not critical to the operation for a resource oriented node 601 containing multiple resources. The framework manager 440 may create or instantiate a node or a resource for all hard dependencies that are present even when a soft is dependency is not present for those nodes or resources which have soft dependencies that are not created. A call back feature may be used to reference the soft dependency so that when the soft dependency becomes available to the framework manager 440, the framework manager 440 will inform each callback referencing the soft dependency that the soft dependencies are now available.

If the inquiry to decision block 1020 is negative, then the "No" branch is followed to block 1027 in which the node structure data is stored by the framework manager 440 in temporary storage such as memory and the framework manager 440 creates a call back feature associated with this un-instantiated node.

If the inquiry to decision block 1015 is positive, then the "Yes" branch is followed to routine 1025 in which a node 601 is created or instantiated based on the node structure data received in routine block 1005. Further details of routine block 1025 will be described below in connection with FIG. 9. Next, in block 1030, the framework manager 440 publishes the newly created node 601 using its unique resource name(s) so that other nodes 601 may send information to or receive information from the newly created node 601.

Figure 7E:
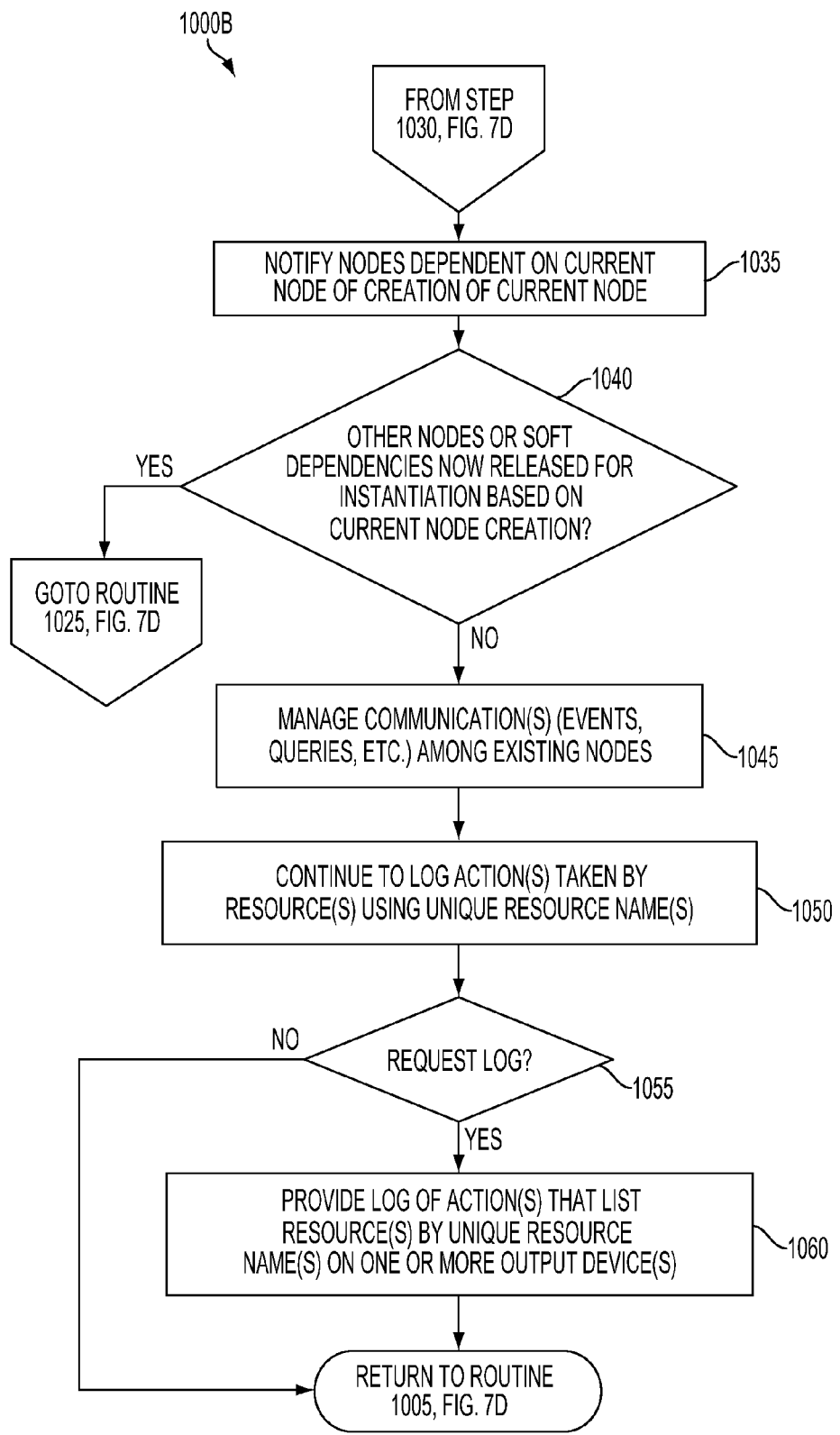
FIG. 7E is a continuation flowchart of FIG. 7D illustrating a method for creating a node architecture for managing resource(s) of a portable computing device.

Referring now to FIG. 7E which is a continuation flow chart of FIG. 7D, in block 1035, the framework manager 440 notifies other nodes 601 which are dependent on the newly created node 601 that the newly created node 601 has been instantiated and is ready to receive or transmit information. According to one exemplary aspect, notifications are triggered immediately when a dependent node, like node 601B of FIG. 7B, is created, i.e., the notifications are performed recursively. So if node 601B of FIG. 7B is constructed, node 601A is immediately notified. This notification may allow node 601A to be constructed (since node 601B was node 601A's final dependency). Construction of node 601B may cause other nodes 601 to be notified, and so on. Node 601B does not get completed until the final resource dependent on node 601B is completed.

A second, slightly more complex, implementation is to put all of the notifications onto a separate notification queue, and then run through the queue beginning at a single point in time, i.e., the notifications are performed iteratively. So when node 601B of FIG. 7B is constructed, the notification to node 601A is pushed onto a list. Then that list is executed and node 601A is notified. This causes the notification to other additional nodes 601 (besides node 601A, not illustrated in FIG. 7B) to be put on the same list, and that notification is then sent after the notification to node 601A is sent. The notifications to other nodes 601 (besides the notification to node 601A) does not occur until after all the work associated with node 601B and node 601A has been completed.

Logically, these two implementations are equivalent, but they have different memory consumption properties when implemented. The recursive realization is simple but can consume an arbitrary amount of stack space, with the stack consumption being a function of the depth of the dependency graph. The iterative implementation is slightly more complex and requires a bit more static memory (the notification list), but stack usage is constant irrespective of the depth of a dependency graph, such as illustrated in FIG. 7B.

Also, notification of node creation in block 1035 is not limited to other nodes. It may also used internally for alias construction. Any arbitrary element in the system 500A can use the same mechanism to request for notification when a node (or marker) becomes available, not just other nodes. Both nodes and non-nodes may use the same notification mechanism.

In decision block 1040, the framework manager 440 determines if other nodes 601 or soft dependencies are now released for creation or instantiation based on the creation of the current node 601. Decision block 1040 generally determines whether resources may be created because certain dependency relationships 680 have been fulfilled by the current node which has recently undergone creation or instantiation.

If the inquiry to decision block 1040 is positive, then the "Yes" branch is followed back to routine block 1025 in which the released node 601 may now be created or instantiated because of the fulfillment of a dependency by the node 601 that was just created.

If the inquiry to decision block 1040 is negative, then the "No" branch is followed to block 1045 in which the frame work manager 440 may manage communications between elements of the architecture as illustrated in FIG. 2. Next, in block 1050, the framework manager 440 may continue to log or record actions taken by resources by using the resource names associated with a particular resource. Block 1045 may be executed by the framework manager 440 after any action taken by the framework manager 440 or any of the elements managed by the framework manager 440, such as the resources, nodes 601, clients 648, events 695, and query functions 697. Block 1045 shows another aspect of the node architecture in which the framework manager 440 may maintain a running log of activity that lists actions performed by each element according to their unique identifier or name provided by the authors who created a particular element, such as a resource of a node 601.

Compared to the prior art, this logging of activity in block 1050 that lists unique names assigned to each resource of a system is unique and may provide significant advantages such as used in debugging and error troubleshooting. Another unique aspect of the node architecture 500A is that separate teams may work on different hardware and/or software elements independently of one another in which each team will be able to use resource names that are unique and easy to track without the need for creating tables to translate less meaningful and usually confusing resource names assigned by other teams and/or the original equipment manufacturer (OEM).

Next, in decision block 1055, the framework manager 440 determines if a log of activity recorded by the framework manager 440 has been requested. If the inquiry to decision block 1055 is negative, then the "No" branch is followed to the end of the process in which the process returns back to routine 1005. If the inquiry to decision block 1055 is positive, then the "Yes" branch is followed to block 1060 in which the framework manager 440 sends the activity log comprising meaningful resource names and respective actions performed by the resource names to an output device, such as a printer or a display screen and/or both. The process then returns to routine block 1005 described above.

Figure 8:
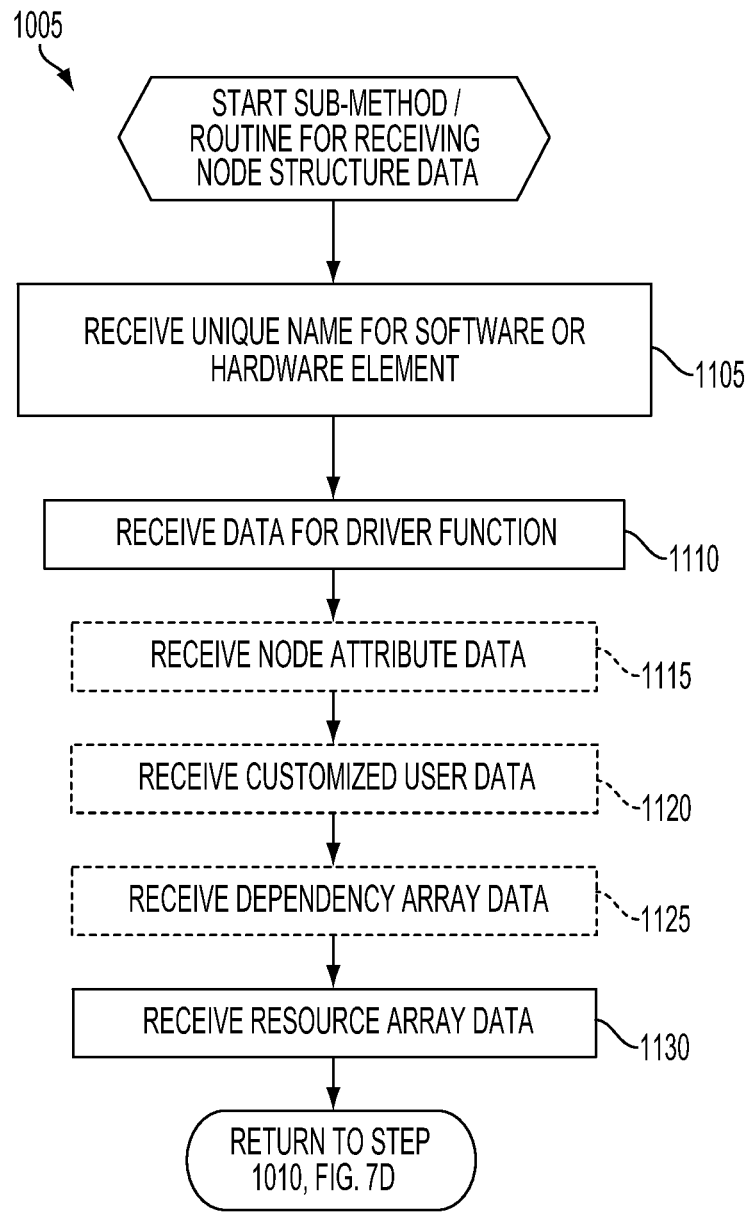
FIG. 8 is a flowchart illustrating a sub-method or a routine of FIG. 7D for receiving node structure data in a software architecture in a portable computing device.

FIG. 8 is a flowchart illustrating a sub-method or a routine 1005 of FIG. 7D for receiving node structure data in a software architecture of a PCD 100. Block 1105 is the first step in the sub method or routine 1005 of FIG. 7D. In block 1105, the framework manager 440 may receive a unique name for a software or hardware element, such as the CPU 110 and the clock 442 of FIG. 7D. As discussed previously, a node 601 must reference at least one resource. Each resource has a unique name in the system 500A. Each element within the system 500A may be identified with a unique name. Each element has a unique name from a character perspective. In other words, generally, there are no two elements within the system 500A which have the same name. According to exemplary aspects of the system, resources of nodes 601 may generally have unique names across the system, but it is not required that client or event names be unique, though they may be unique as desired.

For convenience, a conventional tree file naming structure or file naming "metaphor" that employs forward slash "/" characters for creating unique names may be employed, such as, but not limited to, "/core/cpu" for CPU 110 and "/clk/cpu" for clock 442. However, as recognized by one of ordinary skill in the art, other types of resource names containing any other combination of alpha- numeric characters and/or symbols are well within the scope of the invention.

Next, in block 1110, the framework manager 440 may receive data for one or more driver functions associated with one or more resources of the node 601 being created. A driver function generally comprises the action to be completed by one or more resources for a particular node 601. For example, in FIGS. 7A-7B, the driver function for the resource /core/cpu of node 602 may request the amount of bus bandwidth and the CPU clock frequency it requires in order to provide the requested amount of processing that has been requested. These requests would be made via clients, (such as clients 201, 202, 204 and 206 in FIG. 2) of the resources in nodes 642 and node 622. The driver function for /clk/cpu in node 642 would usually be responsible for actually setting the physical clock frequency in accordance with the request it received from the /core/cpu resource of node 602.

In block 1115, the framework manager 440 may receive node attribute data. The node attribute data generally comprises data that defines the node policies such as security (can the node be accessed via user space applications), remotability (can the node be accessed from other processors in the system) and accessibility (can the resource support multiple concurrent clients). The framework manager 440 may also define attributes that allow a resource to override default framework behavior, such as request evaluation or logging policy.

Subsequently, in block 1120, the framework manager 440 may receive customized user data for the particular node 601 being created. The user data may comprise a void "star" field as understood by one of ordinary skill in the art with respect to the "C" programming language. User data is also known to one of ordinary skill in the art as a "trust me" field. Exemplary customized user data may include, but is not limited to, tables such as frequency tables, register maps, etc. The user data received in block 1120 is not referenced by the system 500A, but allows for customization of a resource if the customization is not recognized or fully supported by the framework manager 440. This user data structure is a base class in the "C" programming language intended to be extended for particular or specific uses.

One of ordinary skill the art recognizes that other kinds of data structures for extending specific uses of a particular class are within the scope of the invention. For example, in the programming language of "C++" (C-plus-plus), an equivalent structure may comprise the key word "public" which would become an extension mechanism for a resource within a node 601.

Next, in block 1125, the framework manager 440 may receive dependency array data. The dependency array data may comprise the unique and specific names of one or more resources 601 on which the node 601 being created is dependent. For example, if the first node 602 of FIG. 7C was being created, then in this block 1125, the dependency array data may comprise the resource names of the three resources of the second node 622 and the single resource name of the third node 642 on which the first node 602 is dependent.

Subsequently, in block 1130, the framework manager 440 may receive resource array data. The resource array data may comprise parameters for the current node being created, such as parameters relevant to the first node 602 of FIGS. 7B-7C if this first node 602 was being created. The resource array data may comprise one or more of the following data: the names of other resources; unit; maximum value; resource attributes; plug-in data; and any customized resource data similar to the customize user data of block 1120. The plug-in data generally identifies functions retrieved from a software library and usually lists the client types that may be supported by the particular node or plurality of nodes being created. The plugin data also allows for customization of client creation and destruction. After block 1130, the process returns to block 1010 of FIG. 7D.

In FIG. 8, the attribute data block 1115, customize user data block 1120, and the dependency array data block 1125 have been illustrated with dashed lines to indicate that these particular steps are optional and not required for any given node 601. Meanwhile the unique name block 1105, a driver function block 1110, and resource array data block 1130 have been illustrated with solid lines to indicate that these steps of routine 1005 are generally mandatory for creating a node 601.

Figure 9:
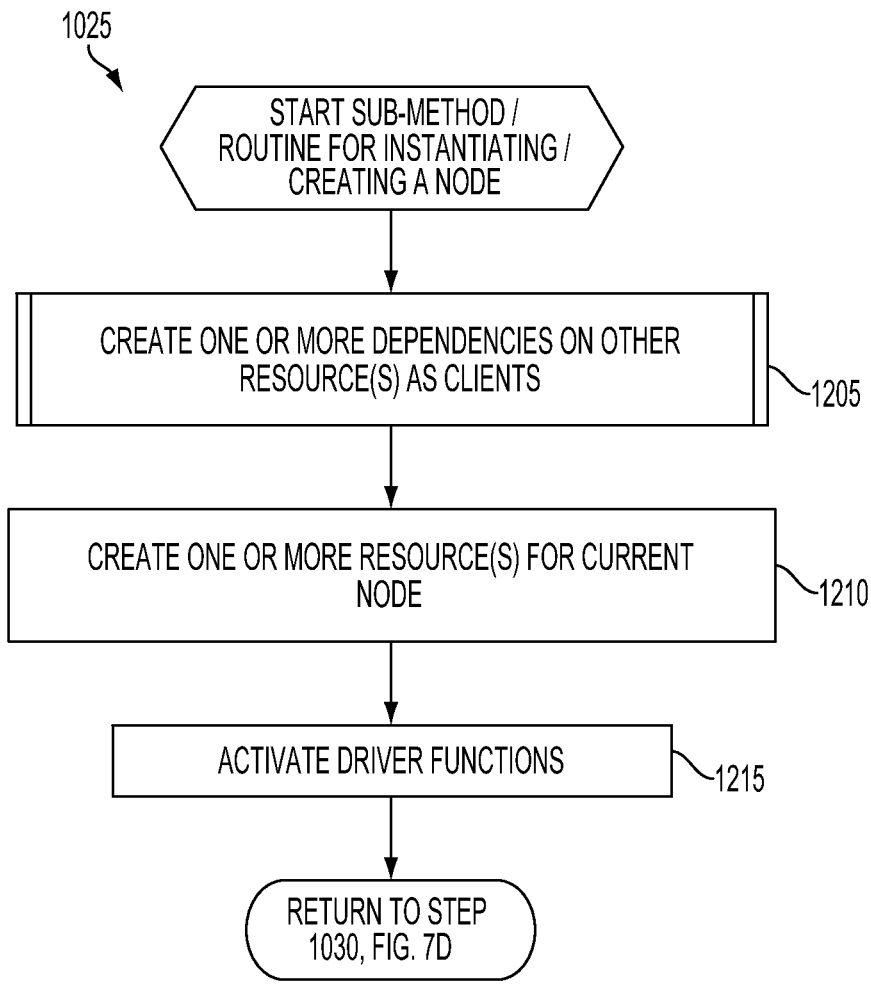
FIG. 9 is a flowchart illustrating a sub-method or a routine of FIGS. 7D-7E for creating a node in a software architecture for a portable computing device.

FIG. 9 is a flowchart illustrating a sub-method or a routine 1025 of FIG. 7D for creating a node in a software architecture for a PCD 100. Routine block 1205 is the first routine in the sub-method or routine 1025 for instantiating or creating a node 601 according to one exemplary embodiment. In routine block 1205, one or more clients 648 that are associated with the node 601 being instantiated are created in this step. Further details about routine block 1205 will be described in further detail below in connection with FIG. 10.

In block 1210, the framework manager may create or instantiate the one or more resources corresponding to the node structure data of block 705. Next, in block 1215, the framework manager 440 may activate the driver functions received in routine block 1110 of routine block 1005. According to one exemplary aspect, the driver functions may be activated using the maximum values received in the resource array data block 1130 of routine block 1005. According to another, preferred, exemplary aspect, each driver function may be activated with an optional, initial value that is passed along with the node structure data from routine 1005. If initial data is not provided, the driver function is initialized at 0—the minimum value. The driver function is also usually activated in manner such that it is known that it is being initialized. This enables the resource to perform any operations that are specific to initialization, but do not need to be performed during normal or routine operation. The process then returns to step 1030 of FIG. 7D.

Figure 10:
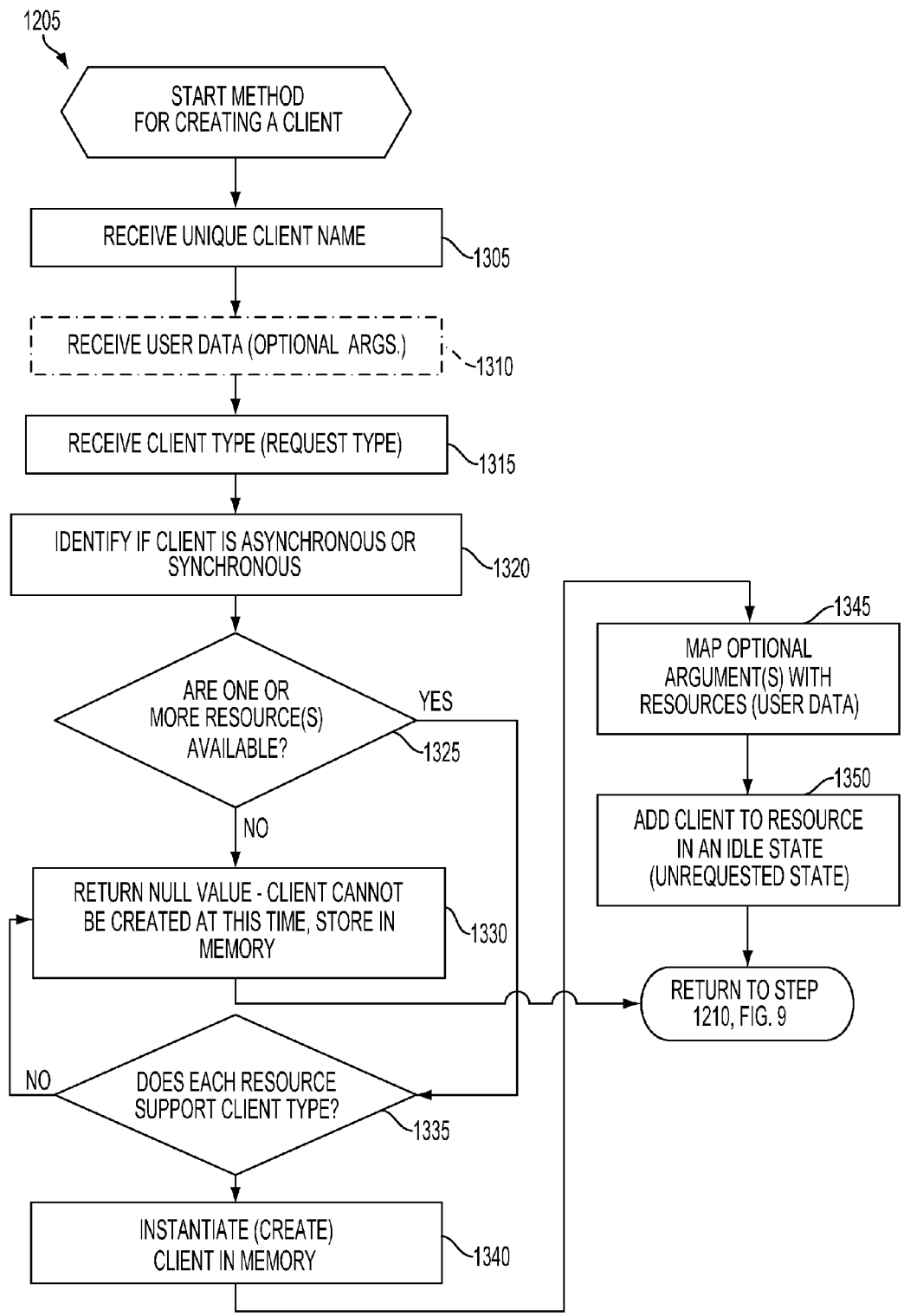
FIG. 10 is a flowchart illustrating a sub-method or a routine of FIG. 9 for creating a client in a software architecture of a portable computing device.

FIG. 10 is a flowchart illustrating a sub-method or a routine 1205 of FIG. 9 for creating a client 648 in a software architecture of a PCD 100. Block 1305 is the first step of routine block 1205 in which a client 648 of one or more resources 601 is created. In block 1205, the framework manager 440 receives a name assigned to the client 648 being created. Similar to resource names, the name for a client 648 may comprise any type of alphanumeric and/or symbols.

Next, in block 1310, customized user data may be received by the framework manager 440 if there are any particular customizations for this client 648 being created. Block 1310 has been illustrated with dashed lines to indicate that the step is optional. The customized user data of block 1310 is similar to the customized user data discussed above in connection with the creation of resources for nodes 601.

In block 1315, the framework manager 440 receives the client type category assigned to the particular client being created. The client type category as of this writing may comprise one of four types: (a) required, (b) impulse, (c) vector, and (d) isochronous. The client type category list may be expanded depending upon the resources being managed by the system 101 and upon the application programs relying upon the resources of the nodes 601.

The required category generally corresponds with the processing of a scalar value that is passed from the required client 648 to a particular resource 601. For example, a required request may comprise a certain number of millions of instructions per second (MIPs). Meanwhile, the impulse category generally corresponds with the processing of a request to complete some activity within a certain period of time without any designation of a start time or stop time.

An isochronous category generally corresponds with a request for an action that is typically reoccurring and has a well-defined start time and a well-defined end time. A vector category generally corresponds with an array of data that usually is part of multiple actions that are required in series or in parallel.

Subsequently, in block 1320, the framework manager 440 receives data that indicates whether the client 648 has been designated as synchronous or asynchronous. A synchronous client 648 is one that typically requires the framework manager 440 to lock a resource of a node 601 until the resource 601 returns data and an indication that the resource 601 has finished completing the requested task from the synchronous client 648.

On the other hand, an asynchronous client 648 may be handled by one or more threads in parallel which are accessed by the framework manager 440. The framework manager 440 may create a callback to a thread and may return a value when the callback has been executed by a respective thread.

After block 1320, in decision block 1325, the framework manager 440 determines if the resource identified by the client 645 are available. If the inquiry to decision block 1325 is negative, then the "No" branch is followed to block 1330 in which a null value or message is returned to a user indicating that the client 648 cannot be created at this time.

If the inquiry to decision block 1325 is positive, then the "Yes" branch is followed to decision block 1335 in which the framework manager 440 determines if each resource identified by the client 648 supports the client type provided in block 1310. If the inquiry to decision block 1335 is negative, then the "No" branch is followed back to block 1330 in which a null value or message is returned indicating that the client 648 cannot be created at this time.

If the inquiry to decision block 1335 is positive, then the "Yes" branch is followed to block 1340 in which the framework manager 440 creates or instantiates the client 648 in memory. Next, in block 1345, if any customized user data is received in block 1310, such as optional arguments, then these optional arguments may be mapped with their respective resources and particular nodes 601. Next, in block 1350, the newly created client 645 is coupled to its corresponding one or more resources in an idle state or on requested state as illustrated in FIG. 10C described above. The process then returns to block 1210 of FIG. 12.

Figure 11:
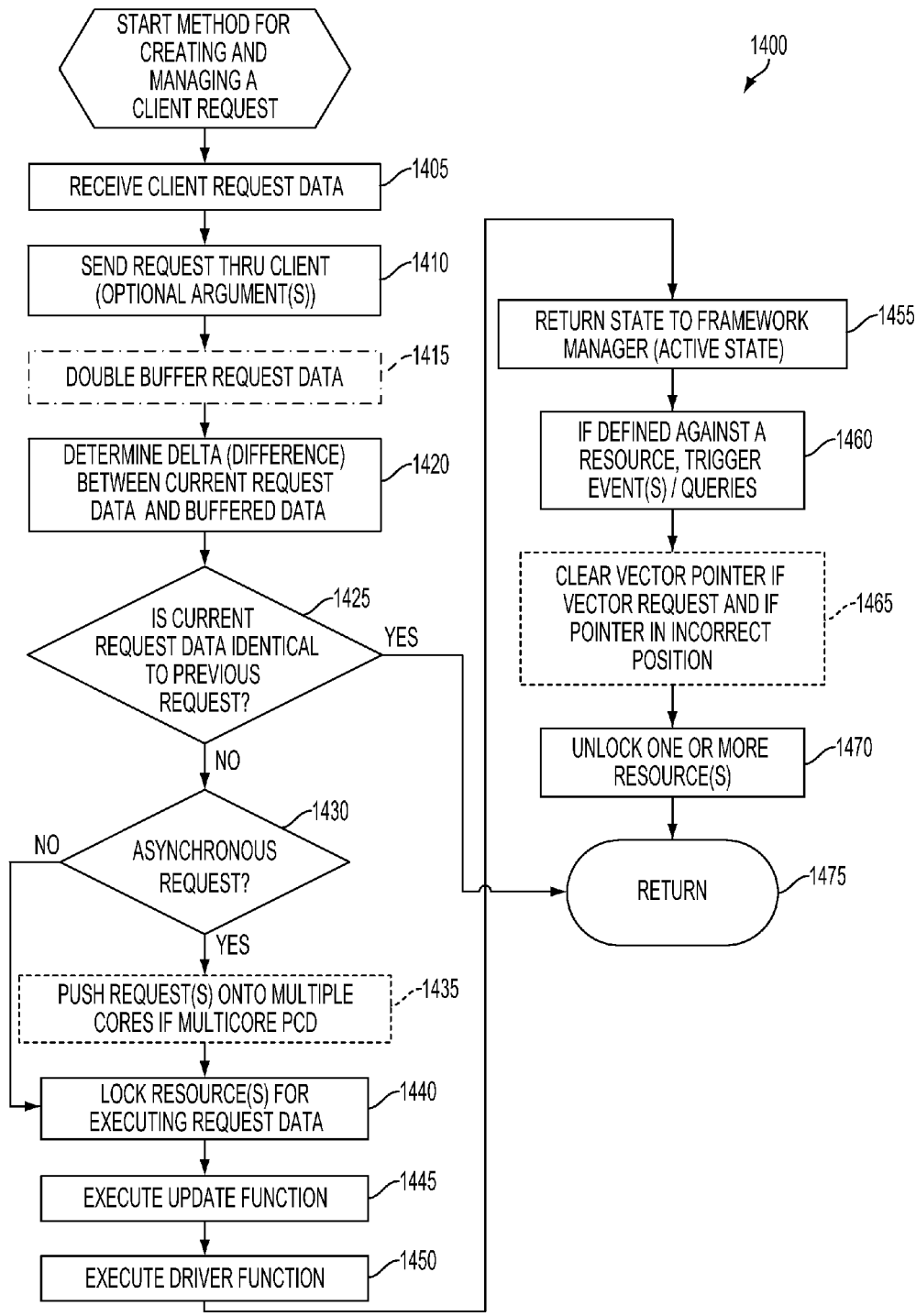
FIG. 11 is a flow chart illustrating a method for creating a client request against a resource in a software architecture for a portable computing device.

FIG. 11 is a flow chart illustrating a method 1400 for creating a client request 675 against a resource 601 in a software architecture for a PCD 100. The method 1400 is generally executed after client creation and node creation as described above in connection with FIGS. 7D-E and FIG. 10.

Block 1405 is the first step in the method 1400 for creating a client request 675 against the resource 601. This method 1400 will describe how the following three types of requests 675 are handled by the framework manager 440: (a) required, (b) impulse, and (c) vector. As the names of the requests 675 mentioned above suggest, client requests 675 generally correspond with client types that were created and described above.

In block 1405, the framework manager 440 may receive the data associated with a particular client request 675 such as one of the three mentioned above: (a) required, (b) impulse, and (c) vector. The data associated with a required request generally comprises a scalar value that is passed from the required client 648 to a particular resource 601. For example, a required request may comprise a certain number of millions of instructions per second (MIPs). Meanwhile, an impulse request comprises a request to complete some activity within a certain period of time without any designation of a start time or stop time. Data for a vector request generally comprises an array of multiple actions that are required to be completed in series or in parallel. A vector request may comprise an arbitrary length of values. A vector request usually has a size value and an array of values. Each resource of a node 601 may be extended to have a pointer field in order to support a vector request. In the "C" programming language, the pointer field is supported by the union function as understood by one of ordinary skill in the art.

Next, in block 1410, the framework manager 440 issues the request through the client 648 that was created by the method described above in connection with FIG. 10. Subsequently, in block 1415, the framework manager 440 double buffers the request data being passed through the client if the request is a required type or a vector type. If the request is an impulse type, then block 1415 is skipped by the framework manager 440.

For required requests, in this block 1415, values from a prior request are maintained in memory so that the framework manager 440 can determine if there is any difference between the previous requested values in the current set of requested values. For vector requests, prior requests are usually not maintained in memory, although a resource of a node 601 may maintain it as desired for a particular implementation. Therefore, block 1415 is optional for vector types of requests.

In block 1420, the framework manager 440 calculates the delta or difference between the previous set of requested values in the current set of requested values. In decision block 1425, the framework manager determines if the current set of requested values is identical to the previous set of requested values. In other words, the framework manager 440 determines if a difference exists between the current set of requested values and the previous set of requested values. If there is no difference between the current set and previous set of requested values, then the "Yes" branch is followed (which skips blocks 1430 through block 1470) to block 1475 in which the process ends.

If the inquiry to decision block 1425 is negative, meaning that the set of requested values are different relative to the set of pre-previous requested values, then the "No" branch is followed to decision block 1430.

In decision block 1430, the framework manager 440 determines if the current request is an asynchronous request. If the inquiry to decision block 1430 is negative, then the "No" branch is followed to block 1440 in which the resource 601 corresponding to the client request 675 is locked by the framework manager 440. If the inquiry to decision block 1430 is positive, meaning that the current request is asynchronous request type, then the "Yes" branch is followed to block 1435 in which the request may be pushed onto another thread and may be executed by another core if a multicore system, like that of FIG. 1, is currently managed by the framework manager 440. Block 1435 has been illustrated with dashed lines to indicate that this step may be optional if the PCD 100 is a single core central processing system.

Subsequently, in block 1440, the resources 601 corresponding to the request 675 is locked by the framework manager 440. Next, in block 1445, the resource 601 executes the update function which generally corresponds to the plug-in data of the resource array data received in block 1130 of FIG. 8. The update function generally comprises a function responsible for the new resource state in light of a new client request. The update function compares its previous state with the requested state in the client request. If the requested state is greater than the previous state, then the update function will perform the client request. However, if the requested state is equal to or less than the current state and which the resource is operating at, then the client request will not be performed in order to increase the efficiency since the old state achieves or satisfies the requested state. An update function takes a new request from the client and aggregates it with all the other active requests to determine the new state for the resource.

As an example, multiple clients may be requesting a bus clock frequency. The update function for the bus clock would usually take the maximum of all the client requests and use that as the new desired state for the bus clock. It is not the case that all resources will use the same update function, although there are some update functions that will be used by multiple resources. Some common update functions are to take the maximum of client requests, to take the minimum of client requests and to sum the client request. Or resources may define their own custom update function if their resource needs to aggregate requests in some unique way.

Next, in block 1450, the framework manager 440 passes the data to the resource corresponding to the client 648 so that the resource may execute the driver function which is specific to the resource of a node 601. A driver function applies the resource state as computed by the update function. This may entail updating hardware settings, issuing requests to dependent resources, calling legacy functions or some combination of the above.

In the previous example, the update function computed the requested bus clock frequency. The driver function may receive that requested frequency and it may update the clock frequency control HW to run at that frequency. Note that sometimes it is not possible for the driver function to meet the exact requested state that update function has computed. In this case, the driver function may choose the frequency that best meets the request. For example, the bus clock HW may only be able to run at 128 MHz and 160 MHz, but the requested state might be 150 MHz. In this case, the driver function should run at 160 MHz, as that exceeds the requested state.

Next, in block 1455, the framework 440 receives state control from the resource which has executed the driver function in block 1450. Subsequently, in block 1460, if defined against the resource, events 690 may be triggered so that data is passed back to the client 648 which corresponds to the event 690. Events may be processed in another thread. This may minimize the amount of time spent with the resources locked and allows for parallel operation in a multicore system as illustrated in FIG. 1. One or more events 690 may be defined against a resource in a manner similar to how a request may be defined against a resource as described in this method 1400. In other words, the event creation process may largely parallel the client creation process. One thing that is different with the events is that it is possible to define events that only get triggered when certain thresholds are crossed.

This defining of events that only get triggered based on thresholds allows for notification of when a resource is getting oversubscribed (it has more concurrent users than it can support) which is indicative of a system overloading condition, or when a resource goes low/off, which may allow other things to be shut off, restore functionality that was disabled when the system became oversubscribed, etc. Because the event registration may be done with thresholds, it reduces the amount of work the system has to do on event notification to only happen when there is something really necessary. It is also possible to register for an event on every state change.

Next, in optional block 1465, if the request being processed is a vector request, then this optional block 1465 is usually performed. Optional block 1465 generally comprises a check or determination to assess whether the vector pointer is still positioned on the same data that the user passed into the vector. If the inquiry to this optional block 1465 is positive, meaning that the pointer is still pointing to the same data which was passed by the user into the vector, then the pointer is cleared out so that references to old data is not maintained. This optional block 1465 is generally performed to account for the double buffering block 1415 described above when a vector request is being processed, compared to an impulse request and a required request.

Subsequently, in block 1470, the framework 440 unlocks the requested resource so that other client requests 648 may be handled by the current but now released requested resource of a particular node 601. The process then returns to the first block 1405 for receiving the next client request.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for managing parallel resource requests in a portable computing device, comprising:
   generating a first request from a first client, the first request issued in the context of a first execution thread;
   forwarding the first request to a resource;
   passing in by the first client a default preference that informs the resource that the first client allows the resource to decide whether or not to allow asynchronous processing;
   wherein the asynchronous processing comprising:
      acknowledging the first request by the resource and initiating asynchronous processing if the resource decides to allow asynchronous processing;
      processing the first request in the resource while allowing the first client to continue processing in the first execution thread; and
      signaling, by the resource, completion of the processing of the first request, the completion of the processing of the first request including updating a local representation of the resource to a new state and invoking any registered callbacks, the resource becoming available to service a second request;
   receiving in the resource the second request; and
   processing the second request in the resource.

2. The method of claim 1, wherein the second request originates in the first client.

3. The method of claim 1, wherein the second request originates in a second client.

4. The method of claim 1, wherein the first request is forwarded to the resource via a resource proxy.

5. The method of claim 1, wherein acknowledging the first request further comprises allowing the first client to continue processing in the first execution thread before the resource processes the first request.

6. The method of claim 1, wherein signaling, by the resource, completion of the processing of the first request makes the resource joinable.

7. The method of claim 1, wherein the local representation of the resource comprises any of a resource proxy and an execution framework.

8. The method of claim 1, wherein acknowledging the first request by the resource and initiating asynchronous processing places the resource in an incoherent state and the second request causes the resource to return to a coherent state and be available to process the second request.

9. The method of claim 1, wherein the resource is made available without receiving the second request.

10. The method of claim 1, wherein the second request is issued in the context of the first execution thread.

11. The method of claim 1, wherein the second request is issued in the context of a second execution thread.

12. A computer system for managing parallel resource requests in a portable computing device, the system comprising:
a processor operable for:
generating a first request from a first client, the first request issued in the context of a first execution thread;
forwarding the first request to a resource;
passing in by the first client a default preference that informs the resource that the first client allows the resource to decide whether or not to allow asynchronous processing;
acknowledging the first request by the resource and initiating asynchronous processing if the resource decides to allow asynchronous processing;
wherein the asynchronous processing comprising:
processing the first request in the resource while allowing the first client to continue processing in the first execution thread; and
signaling, by the resource, completion of the processing of the first request, the completion of the processing of the first request including updating a local representation of the resource to a new state and invoking any registered callbacks, the resource becoming available to service a second request;
receiving in the resource the second request; and
processing the second request in the resource.

13. The system of claim 12, wherein the second request originates in the first client.

14. The system of claim 12, wherein the second request originates in a second client.

15. The system of claim 12, wherein the first request is forwarded to the resource via a resource proxy.

16. The system of claim 12, wherein acknowledging the first request further comprises allowing the first client to continue processing in the first execution thread before the resource processes the first request.

17. The system of claim 12, wherein signaling, by the resource, completion of the processing of the first request makes the resource joinable.

18. The system of claim 12, wherein the local representation of the resource comprises any of a resource proxy and an execution framework.

19. The system of claim 12, wherein acknowledging the first request by the resource and initiating asynchronous processing places the resource in an incoherent state and the second request causes the resource to return to a coherent state and be available to process the second request.

20. The system of claim 12, wherein the resource is made available without receiving the second request.

21. The system of claim 12, wherein the second request is issued in the context of the first execution thread.

22. The system of claim 12, wherein the second request is issued in the context of a second execution thread.

23. A computer system for managing parallel resource requests in a portable computing device, the system comprising:
means for generating a first request from a first client, the first request issued in the context of a first execution thread;
means for forwarding the first request to a resource;
means for passing in by the first client a default preference that informs the resource that the first client allows the resource to decide whether or not to allow asynchronous processing;
means for acknowledging the first request by the resource and initiating asynchronous processing if the resource decides to allow asynchronous processing;
wherein the asynchronous processing comprising:
means for processing the first request in the resource while allowing the first client to continue processing in the first execution thread; and
means for signaling, by the resource, completion of the processing of the first request, the completion of the processing of the first request including updating a local representation of the resource to a new state and invoking any registered callbacks, the resource becoming available to service a second request;
means for receiving in the resource the second request; and
means for processing the second request in the resource.

24. The system of claim 23, wherein the second request originates in the first client.

25. The system of claim 23, wherein the second request originates in a second client.

26. The system of claim 23, further comprising means for forwarding the first request to the resource via a resource proxy.

27. The system of claim 23, wherein the means for acknowledging the first request further comprises means for allowing the first client to continue processing in the first execution thread before the resource processes the first request.

28. The system of claim 23, wherein signaling, by the resource, completion of the processing of the first request makes the resource joinable.

29. The system of claim 23, wherein the local representation of the resource comprises any of a resource proxy and an execution framework.

30. The system of claim 23, wherein the means for acknowledging the first request by the resource and initiating asynchronous processing places the resource in an incoherent state and the second request causes the resource to return to a coherent state and be available to process the second request.

31. The system of claim 23, wherein the resource is made available without receiving the second request.

32. The system of claim 23, wherein the second request is issued in the context of the first execution thread.

33. The system of claim 23, wherein the second request is issued in the context of a second execution thread.

34. A computer program product comprising a computer usable medium having a computer readable program code embodied therein, said computer readable program code adapted to be executed to implement a method for managing parallel resource requests in a portable computing device, said method comprising:
generating a first request from a first client, the first request issued in the context of a first execution thread;
forwarding the first request to a resource;

passing in by the first client a default preference that informs the resource that the first client allows the resource to decide whether or not to allow asynchronous processing;

acknowledging the first request by the resource and initiating asynchronous processing if the resource decides to allow asynchronous processing;

wherein the asynchronous processing comprising:
    processing the first request in the resource while allowing the first client to continue processing in the first execution thread; and
    signaling, by the resource, completion of the processing of the first request, the completion of the processing of the first request including updating a local representation of the resource to a new state and invoking any registered callbacks, the resource becoming available to service a second request;

receiving in the resource the second request; and processing the second request in the resource.

35. The computer program product of claim 34, wherein the second request originates in the first client.

36. The computer program product of claim 34, wherein the second request originates in a second client.

37. The computer program product of claim 34, wherein the first request is forwarded to the resource via a resource proxy.

38. The computer program product of claim 34, wherein acknowledging the first request further comprises allowing the first client to continue processing in the first execution thread before the resource processes the first request.

39. The computer program product of claim 34, wherein signaling, by the resource, completion of the processing of the first request makes the resource joinable.

40. The computer program product of claim 34, wherein the local representation of the resource comprises any of a resource proxy and an execution framework.

41. The computer program product of claim 34, wherein acknowledging the first request by the resource and initiating asynchronous processing places the resource in an incoherent state and the second request causes the resource to return to a coherent state and be available to process the second request.

42. The computer program product of claim 34, wherein the resource is made available without receiving the second request.

43. The computer program product of claim 34, wherein the second request is issued in the context of the first execution thread.

44. The computer program product of claim 34, wherein the second request is issued in the context of a second execution thread.

\* \* \* \* \*